US 8,245,948 B2

(12) United States Patent
Cho et al.

(10) Patent No.: US 8,245,948 B2
(45) Date of Patent: Aug. 21, 2012

(54) CO-GENERATION AND CONTROL METHOD OF THE SAME

(75) Inventors: Eun Jun Cho, Buchun-si (KR); Sim Bok Ha, Kwangmyung-si (KR); Cheol Min Kim, Changwon-si (KR); Se Dong Chang, Kwangmyung-si (KR)

(73) Assignee: LG Electronics Inc., Seoul (KR)

( * ) Notice: Subject to any disclaimer, the term of this patent is extended or adjusted under 35 U.S.C. 154(b) by 1213 days.

(21) Appl. No.: 11/783,888

(22) Filed: Apr. 12, 2007

(65) Prior Publication Data

US 2008/0023961 A1   Jan. 31, 2008

(30) Foreign Application Priority Data

Jul. 25, 2006 (KR) .................. 10-2006-0069783

(51) Int. Cl.
*F25B 27/02* (2006.01)
*F25B 13/00* (2006.01)

(52) U.S. Cl. .......... 237/12.1; 237/2 B; 237/8 C; 237/13; 237/16; 237/19; 60/648; 62/238.7; 122/1 R; 219/200; 219/201

(58) Field of Classification Search .............. 237/2 b, 237/8 a, 8 b, 8 r, 8 c, 9 r, 12.1, 13, 16, 19; 122/1 r; 126/19.5, 344; 219/200, 201; 60/648; 62/238.7; *F25B 27/02, 13/00*
See application file for complete search history.

(56) References Cited

U.S. PATENT DOCUMENTS

| 2,557,369 A | * | 6/1951 | Broderick | ............. 237/8 R |
| 2,833,273 A | * | 5/1958 | Miller | ................. 122/14.3 |
| 3,575,157 A | * | 4/1971 | Whittel, Jr. | ............ 122/14.2 |
| 4,060,997 A | * | 12/1977 | Shultz et al. | ............ 62/180 |

(Continued)

FOREIGN PATENT DOCUMENTS

DE  19731343  1/1999

(Continued)

OTHER PUBLICATIONS

European Search Report dated May 26, 2008 issued in Application No. 07 10 6117.

(Continued)

*Primary Examiner* — Steven B McAllister
*Assistant Examiner* — Daniel E Namay
(74) *Attorney, Agent, or Firm* — Ked & Associates LLP

(57) ABSTRACT

A co-generation system is provided that includes a heat exchanger that heats water; a heat transfer path connected with the water heat exchanger that transfers heat; a hot water storage tank connected with the water heat exchanger and the water circulation path; a hot water storage water supply apparatus that supplies water in the hot water storage tank to the water circulation path; a water supply path connected with the water circulation path; a water supply apparatus that supplies water to the water supply path; and a hot water supply heat exchanger bypassing apparatus that bypasses the water supplied to the water circulation path from the hot water storage tank through the hot water supply heat exchanger. With the co-generation system, so constructed, effective water boil heat is increased, as supplying the cold water supplied from the water service and the hot water supplied from the hot water storage tank to the hot water supply heat exchanger properly and heat exchanging with the heat medium, such as an anti-freeze solution, passing through the hot water supply heat exchanger.

12 Claims, 11 Drawing Sheets

U.S. PATENT DOCUMENTS

| | | | |
|---|---|---|---|
| 4,143,814 A * | 3/1979 | Hill, Jr. | 126/610 |
| 4,429,536 A * | 2/1984 | Nozawa | 60/655 |
| 4,614,090 A | 9/1986 | Kaneko et al. | |
| 4,715,192 A | 12/1987 | Katz | |
| 4,754,607 A * | 7/1988 | Mackay | 60/723 |
| 4,873,840 A * | 10/1989 | Gilliusson | 62/238.6 |
| 4,987,748 A * | 1/1991 | Meckler | 62/176.1 |
| 5,003,788 A | 4/1991 | Fischer | |
| 6,435,420 B1 * | 8/2002 | Kasai et al. | 237/12.1 |
| 2001/0042374 A1 | 11/2001 | Takamatsu | |
| 2002/0108745 A1 * | 8/2002 | Kimura | 165/236 |
| 2002/0148415 A1 * | 10/2002 | Manley et al. | 122/40 |
| 2003/0024685 A1 | 2/2003 | Ace | |
| 2004/0200905 A1 * | 10/2004 | Saitoh et al. | 237/19 |
| 2006/0037338 A1 * | 2/2006 | Kim et al. | 62/238.7 |
| 2006/0037351 A1 | 2/2006 | Kim et al. | |
| 2006/0123818 A1 * | 6/2006 | Kim et al. | 62/236 |
| 2006/0236698 A1 * | 10/2006 | Langson | 60/651 |
| 2007/0246555 A1 * | 10/2007 | Nishimura et al. | 237/2 B |
| 2008/0022707 A1 * | 1/2008 | Cho et al. | 62/238.1 |

FOREIGN PATENT DOCUMENTS

| | | |
|---|---|---|
| DE | 19740398 | 3/1999 |
| EP | 1 628 100 A2 | 2/2006 |
| EP | 1628096 | 2/2006 |
| EP | 1628101 | 2/2006 |
| JP | 03-294765 A | 12/1991 |
| JP | 06-281289 A | 10/1994 |
| JP | 2005-147610 | 6/2005 |

OTHER PUBLICATIONS

U.S. Office Action dated Mar. 5, 2009 issued in U.S. Appl. No. 11/785,068.

* cited by examiner

CO-GENERATION AND CONTROL METHOD OF THE SAME

BACKGROUND OF THE INVENTION

1. Field of the Invention

The present invention relates to a co-generation system and a control method of the same in which waste heat of an engine is transferred to a hot-water supply heat exchanger by an antifreeze solution, and more particularly, to a co-generation system and a control method of the same that maximizes the efficiency of a hot water supply by controlling the hot water supply and a heat storage in accordance with a temperature of water supplied from outside, of a hot water storage tank that stores the water heated in the hot-water supply heat exchanger, and a temperature of a heat medium streaming into the hot-water supply heat exchanger.

2. Description of the Conventional Art

FIG. 1 is a block diagram of a co-generation system according to the conventional art.

The conventional co-generation system, as depicted in FIG. 1, includes an electric generator 2 that generates electricity, a drive source 10 (hereinafter referred to as "engine"), such as an engine, that generates heat as well as drives the electric generator 2, a waste heat recovery apparatus 20 that recovers the waste heat generated from the engine 10, and a hot water supply tank 30 that uses the waste heat from the waste heat recovery apparatus 20.

The electric generator 2 and the engine 10 are installed in the inside of an engine room E of a chassis formed apart from the hot water supply tank 30. The electricity generated at the electric generator 2 is supplied to home appliances, such as various kinds of illuminators and a heat pump type air conditioner 4.

The heat pump type air conditioner 4 includes a compressor 5, a 4-way valve 6, an indoor heat exchanger 7, an expanding apparatus 8, and an outdoor heat exchanger 9. When the refrigerant compressed in the compressor 5 is circulated to the compressor 5 after passing through the 4-way valve 6, the outdoor heat exchanger 9, the expanding apparatus 8, and the indoor heat exchanger 7 and the 4-way valve 6 in sequence when the heat pump type air conditioner 4 is in a cooling operation, the outdoor heat exchanger 9 operates as a condenser and the indoor heat exchanger 7 operates as an evaporator to take heat from indoor air. On the other hand, when the refrigerant compressed in the compressor 5 is circulated to the compressor after passing through the 4-way valve 6, the indoor heat exchanger 7, the expanding apparatus 8, the outdoor heat exchanger 9, and the 4-way valve 6 in sequence when the heat pump type air conditioner 4 is in a heating operation, the outdoor heat exchanger 9 operates as an evaporator and the indoor heat exchanger 7 operates as a condenser to warm the indoor air.

The waste heat recovery apparatus 20 includes an exhaust gas heat exchanger 22 that takes heat of the exhaust gas exhausted from the engine 10, and a cooling water heat exchanger 24 that takes heat of the cooling water used to cool the engine 10. The exhaust gas heat exchanger 22 is connected with the hot water supply tank 30 by a first heat supply line 23, and the waste heat taken from the exhaust gas of the engine 10 is transferred to the hot water supply tank 30 through the first heat supply line 23. The cooling water heat exchanger 24 is connected with the hot water supply tank 30 by a second heat supply line 25, and the heat taken from the cooling water used to cool the engine 10 is transferred to the hot water supply tank 30 through the second heat supply line 25. A hot water supply is connected with the hot water supply tank 30.

Water supplied through a water supply path 32 is discharged through a water discharge path 34 after being boiled in the hot water supply tank 30, as the water supply path 32, through which the water is supplied from outside and the water discharge path 34, which discharges the water heated in the hot water supply tank 30, are connected with the hot water supply tank 30.

The efficiency of the co-generation system according to the conventional art cannot be maximized because the waste heat of the engine 10 is not used in the heat pump type air conditioner 4, but is only used to supply the hot water.

SUMMARY OF THE INVENTION

The present invention is configured to overcome the above-mentioned conventional problems, and an object of the present invention is to provide a co-generation system and control method of the same that increases hot water supply efficiency, by transferring waste heat of a drive source to cold water supplied from outside and hot water supplied from a hot water storage tank, or to one of them selectively, and maximizes the hot water supply efficiency while minimizing power consumption of the air conditioner.

The co-generation system according to the present invention configured to achieve the above-mentioned object includes a hot water supply heat exchanger that heats water; a heat transfer path connected with the hot water supply heat exchanger that transfers heat; a hot water storage tank connected with the hot water supply heat exchanger and the water circulation path; a hot water storage pump installed at the water circulation path; a water supply path connected with the water circulation path; a water supply pump installed at the water supply path; a hot water supply heat exchanger bypassing path formed at the water circulation path; and a hot water supply heat exchanger bypassing valve that controls the water circulation path and the hot water supply heat exchanger bypassing path.

The co-generation system further includes a hot water storage temperature sensor that gauges or senses a temperature of the water supplied to the water circulation path from the hot water storage tank; a water boil recovery entrance temperature sensor that gauges or senses a temperature of the water streaming into the hot water supply heat exchanger; a water boil entrance temperature sensor that gauges or senses a temperature of the heat medium streaming into the hot water supply heat exchanger through the heat transfer path; and a control unit or controller that controls the water supply pump, the water storage pump, and the hot water supply heat exchanger bypassing valve in accordance with the temperature sensed by the hot water storage temperature sensor, the water boil recovery entrance temperature sensor, and the water boil entrance temperature sensor.

The co-generation system further includes an electric generator; a drive source that operates the electric generator; and a waste heat recovery heat exchanger that recovers the waste heat of the drive source and connected with the heat transfer path.

The co-generation system according to the present invention includes an electric generator; a drive source that operates the electric generator; a waste heat recovery heat exchanger that recovers the waste heat from the drive source; a hot water supply heat exchanger installed to heat the water; an air conditioner that cools the indoor air; a supplying heat exchanger installed at the refrigerant path of the air conditioner; a heat transferring path that connects the waste heat recovery heat exchanger, the hot water supply heat exchanger, and the supplying heat exchanger; a hot water storage tank connected with the hot water supply heat exchanger and the water circulation path; a water supply path connected with the water circulation path; and a hot water supply heat exchanger bypassing apparatus that bypasses the water supplied to the water circulation path from the hot water storage tank through the hot water supply heat exchanger.

The air conditioner is a heat pump type air conditioner including a compressor, a 4-way valve, an outdoor heat exchanger, an expanding apparatus, and an indoor heat exchanger. The heat pump type air conditioner further includes an outdoor heat exchanger bypassing apparatus that bypasses the refrigerant through the outdoor heat exchanger. The supplying heat exchanger is installed at the refrigerant path between the 4-way valve and the outdoor heat exchanger.

The co-generation system further includes a hot water supply heat exchanger bypassing apparatus that bypasses the heat of the waste heat recovery heat exchanger through the hot water supply heat exchanger; and a supplying heat exchanger bypassing apparatus that bypasses the heat of the waste heat recovery heat exchanger through the supplying heat exchanger.

The co-generation system further includes an exhausting heat exchanger that exhausts the heat to the outside installed between the hot water supply heat exchanger and the supplying heat exchanger on a heat transfer path; a hot water supplying/exhausting heat exchanger bypassing apparatus that bypasses the heat of the waste heat recovery heat exchanger through the hot water supply heat exchanger and the exhausting heat exchanger; an exhausting heat exchanger bypassing apparatus that bypasses the heat of the waste heat recovery heat exchanger through the exhausting heat exchanger; and a supplying heat exchanger bypassing apparatus that bypasses the heat of the waste heat recovery heat exchanger through the supplying heat exchanger.

A check valve is installed at the water supply path. The water supply path is connected with the reservoir.

The co-generation system further includes a hot water storage tank water supply apparatus that supplies water in the hot water storage tank to the water circulation path, and a water supply apparatus that supplies water to the water supply path. The hot water supply heat exchanger bypassing apparatus includes a hot water supply heat exchanger bypassing path formed at the water circulation path, and a hot water supply heat exchanger bypassing valve that controls the hot water supply heat exchanger bypassing path. A check valve is installed between the hot water storage tank and the hot water supply heat exchanger bypassing valve at the water circulation path.

The co-generation system further includes a hot water storage tank temperature sensor that gauges or senses a temperature of the water supplied to the water circulation path from the hot water storage tank; a water boil recovery entrance temperature sensor that gauges or senses a temperature of the water streaming into the hot water supply heat exchanger; a water boil entrance temperature sensor that gauges or senses a temperature of the heat medium streaming into the hot water supply heat exchanger through the heat transfer path; and a control unit or controller that controls the water supply apparatus, the hot water storage tank water supply apparatus, and the hot water supply heat exchanger bypassing valve in accordance with the temperatures sensed by the hot water storage tank temperature sensor, the water boil recovery entrance temperature sensor, and the water boil entrance temperature sensor. The hot water storage tank water supply apparatus includes a hot water storage tank pump installed at the water circulation path, and the water supply apparatus includes a water supply pump installed at the water supply path.

The control method of the co-generation system according to the present invention drives the water supply pump and the hot water storage tank pump, and controls the hot water supply heat exchanger bypassing valve to be in a hot water supply heat exchanger supply mode when a temperature of the hot water storage tank is at a first set point more than a temperature of a water boil recovery entrance, and a temperature of the water boil entrance is at a second set point more than a temperature of the hot water storage tank. Further, the control method of the co-generation system according to the present invention drives the water supply pump and the hot water storage tank pump, and controls the hot water supply heat exchanger bypassing valve to be in a hot water supply heat exchanger bypassing mode when the temperature of the hot water storage tank is at a first set point more than the temperature of the water boil recovery entrance, and the temperature of the water boil entrance is not at a second set point more than the temperature of the hot water storage tank.

The control method of the co-generation system according to the present invention drives the hot water storage tank pump as well as stops operating the water supply pump, and controls the hot water supply heat exchanger bypassing valve to be in the hot water supply heat exchanger supply mode when the temperature of the hot water storage tank is not at a first set point more than the temperature of the water boil recovery entrance, and the temperature of the water boil entrance is at a second set point more than the temperature of the hot water storage tank.

Additionally, the control method of the co-generation system according to the present invention drives the hot water storage tank pump as well as stops operating of the water supply pump, and controls the hot water supply heat exchanger bypassing valve to be in the hot water supply heat exchanger bypassing mode when the temperature of the hot water storage tank is not at a first set point more than the temperature of the water boil recovery entrance and the temperature of the water boil entrance is not at a second set point more than the temperature of the hot water storage tank.

The co-generation system and the control method of the same according to the present invention constructed as discussed above are advantageous in that the effective water boil heat is increased by supplying the cold water supplied from the water supply and the hot water supplied from the hot water storage tank properly to the hot water supply heat exchanger, and heat exchanging it with a heat medium, such as an antifreeze solution, and passing it through the hot water supply heat exchanger.

DETAILED DESCRIPTION OF THE INVENTION

Reference will now be made in detail hereinafter to a co-generation system and the control method of the same in accordance with the present invention with reference to the accompanying drawings.

Figure 1:
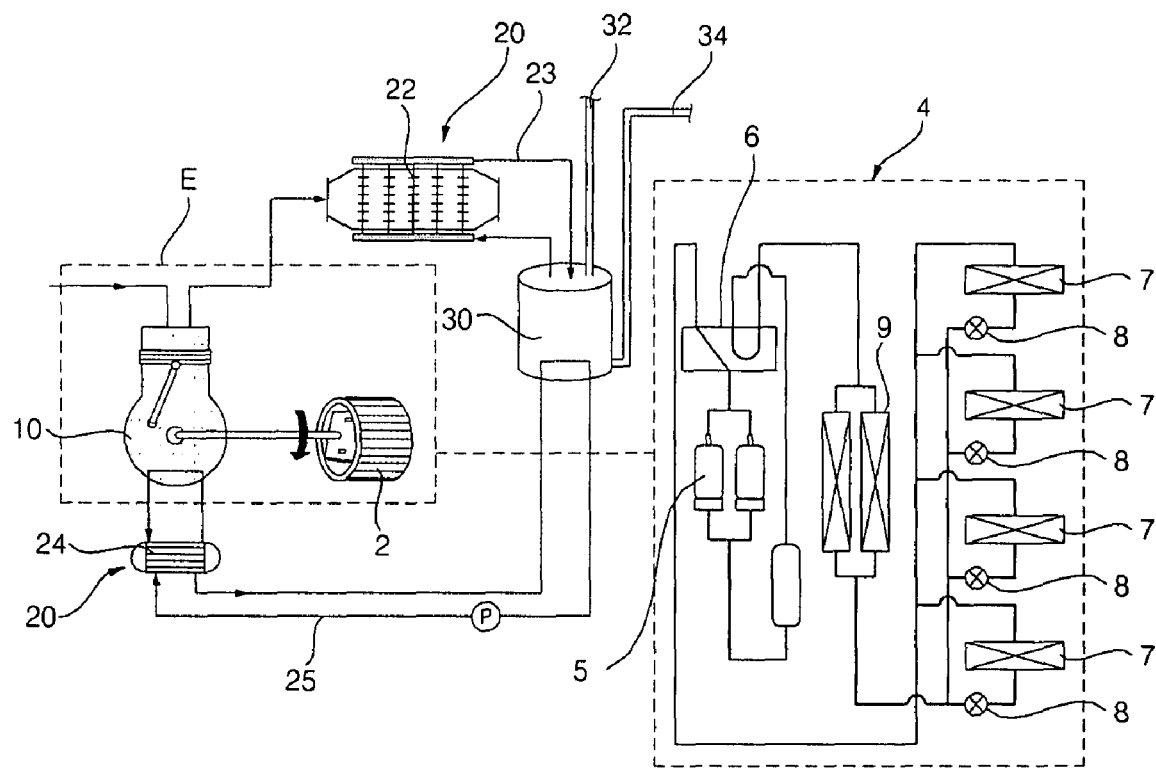
FIG. 1 is a block diagram of a co-generation system according to the conventional art.
Figure 2:
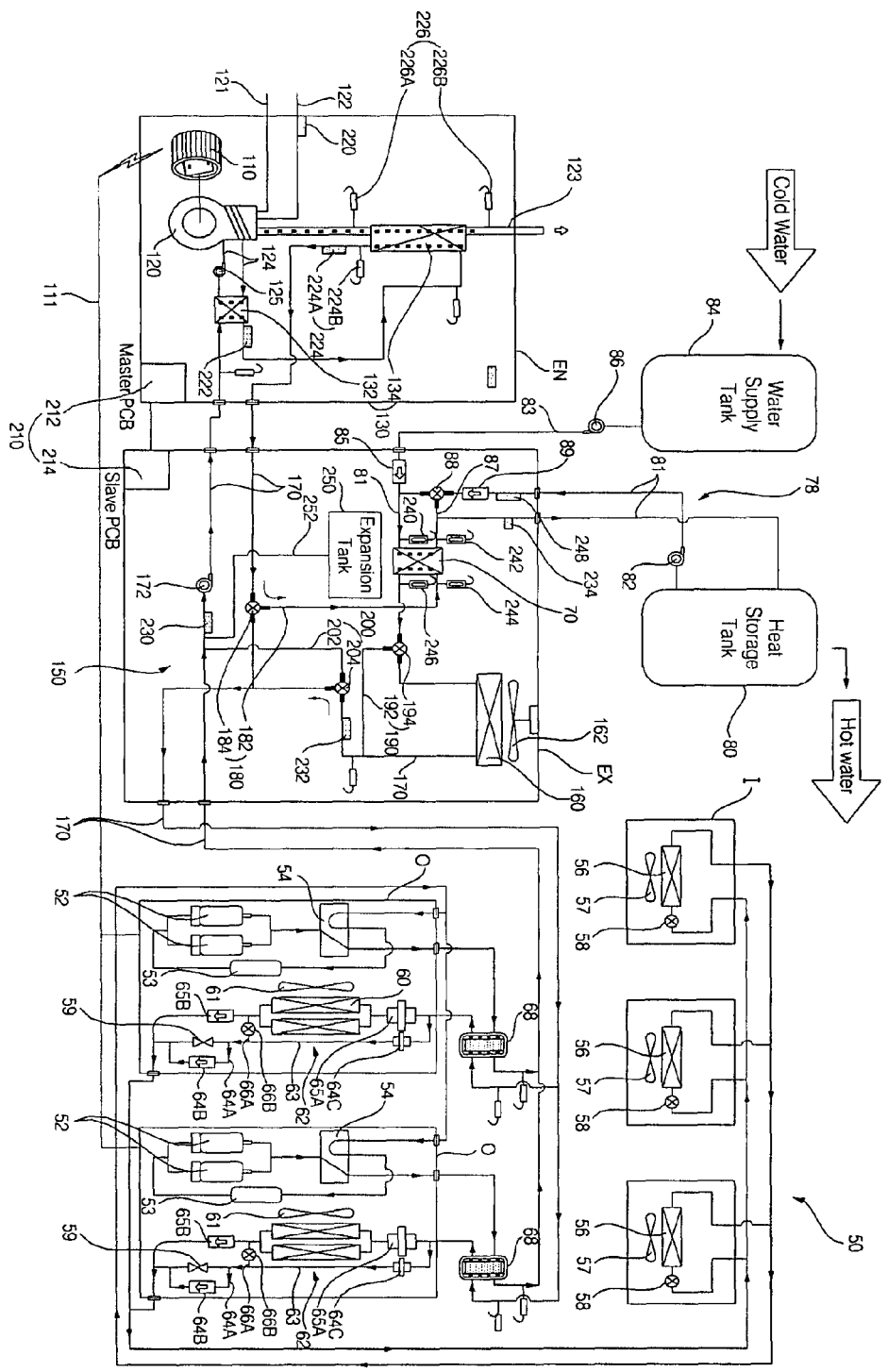
FIG. 2 is a block diagram illustrating an air conditioner according to an embodiment of a co-generation system according to the present invention operating for air-cooling and under a water boil mode.
Figure 3:
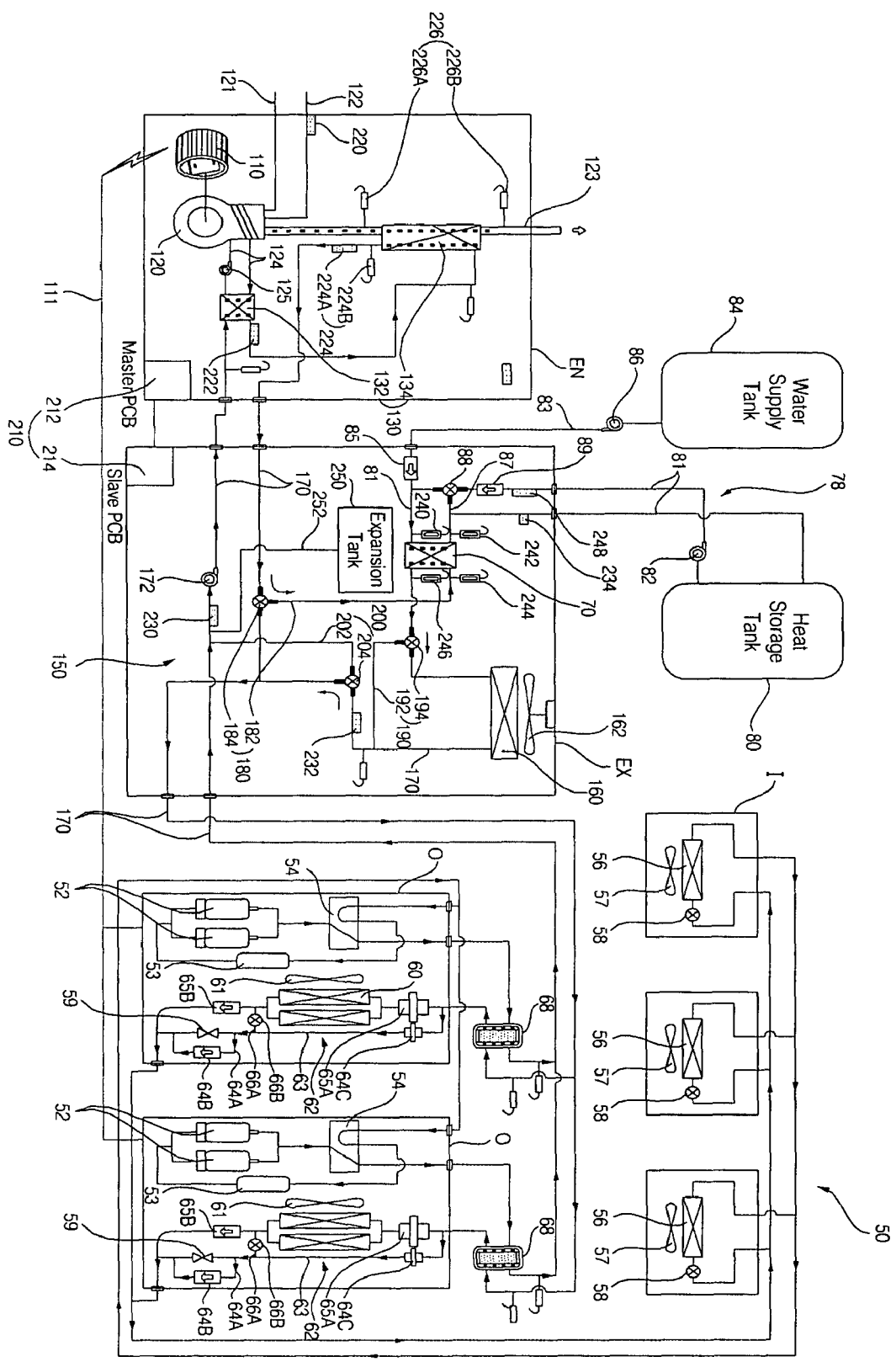
FIG. 3 is a block diagram illustrating an air conditioner of an embodiment of a co-generation system according to the present invention operating for air-cooling and under a not water boil mode.
Figure 4:
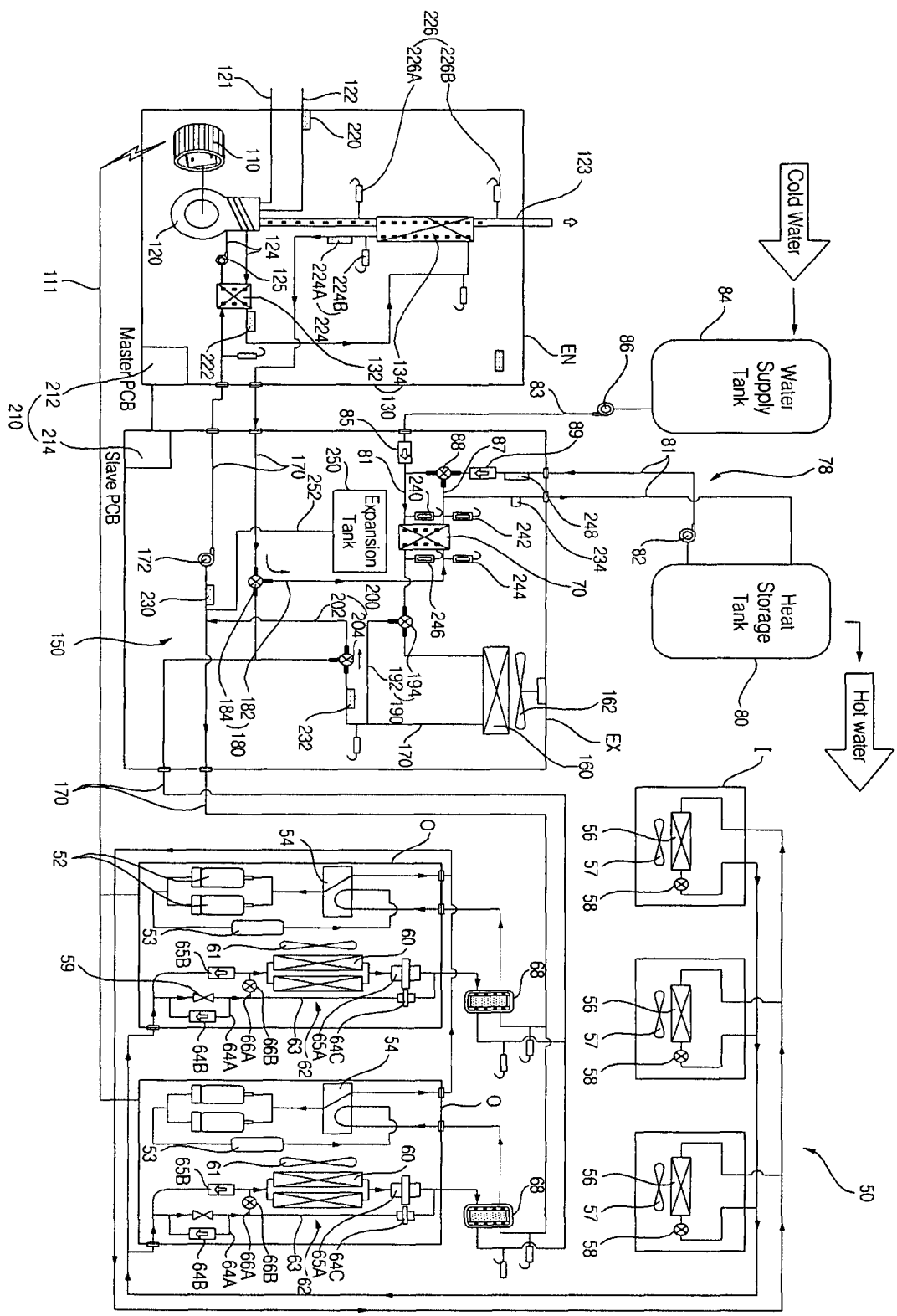
FIG. 4 is a block diagram illustrating a condition that an air conditioner of an embodiment of a co-generation system according to the present invention operates for air heating under an outdoor fan control mode and the water boil mode.
Figure 5:
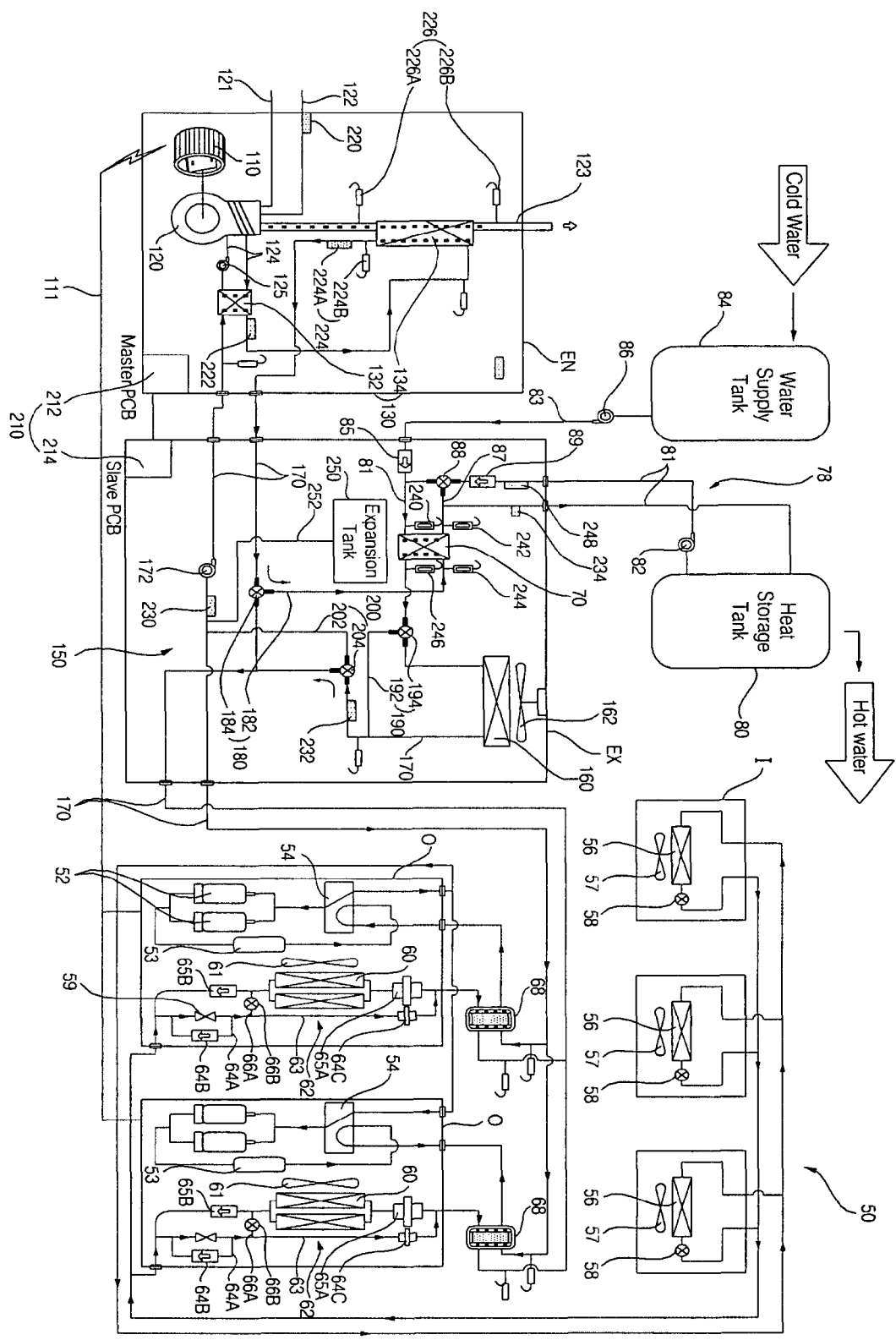
FIG. 5 is a block diagram illustrating an air conditioner of an embodiment a the co-generation system according to the present invention operating for air heating under a low-pressure control mode and the water boil mode.
Figure 6:
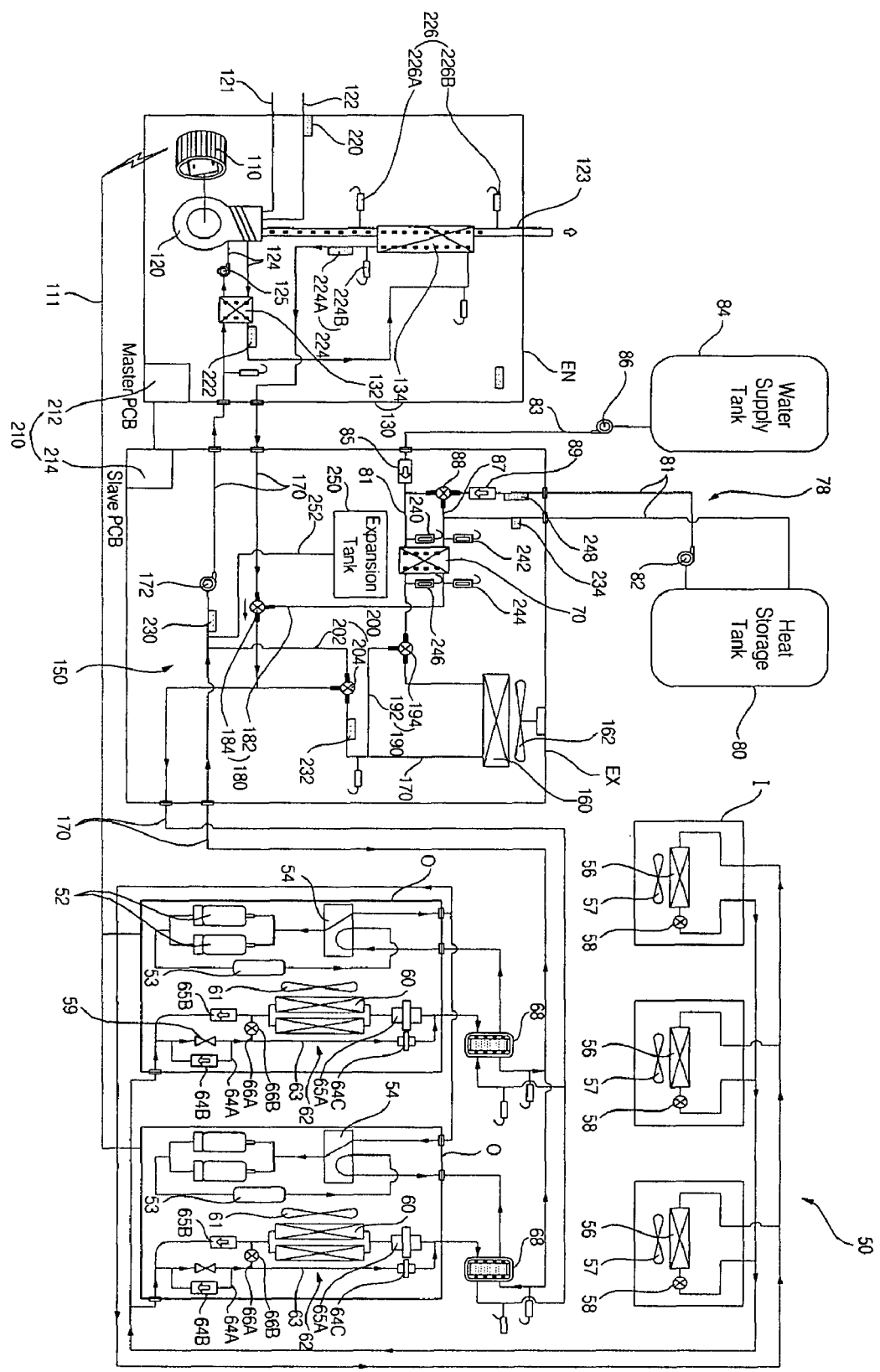
FIG. 6 is a block diagram illustrating an air conditioner of an embodiment of a co-generation system according to the present invention operating for air heating under a maximum supply mode and the not water boil mode.

FIG. 2 is a block diagram illustrating an air conditioner of an embodiment of a co-generation system according to the present invention operating for air-cooling and under a water boil mode. FIG. 3 is a block diagram illustrating an air conditioner of an embodiment of a co-generation system according to the present invention operating for air-cooling under a not water boil mode. FIG. 4 is a block diagram illustrating a condition in which an air conditioner of an embodiment of a co-generation system according to the present invention operates for air heating under an outdoor fan control mode and the water boil mode. FIG. 5 is a block diagram illustrating an air conditioner of an embodiment of a co-generation system according to the present invention operating for air heating under a low-pressure control mode and the water boil mode. FIG. 6 is a block diagram illustrating an air conditioner of an embodiment of a co-generation system according to the present invention operating for air heating under a maximum supply mode and the not water boil mode.

The co-generation system according to the present embodiment includes an air conditioner 50 that air-conditions indoor air, a hot water supply heat exchanger 70 that boils water, an electric generator 110 that generates electricity, a drive source 120 that operates the electric generator 110 and generates heat, and a waste heat recovery heat exchanger 130 that recovers the waste heat of the drive source 120, as illustrated in FIGS. 2 to 6.

It is possible for the air conditioner 50 to be composed of a heat pump type air conditioner including a compressor 52, a 4-way valve 54, an indoor heat exchanger 56, an expansion apparatus 58 and 59, and an outdoor heat exchanger 60, and also possible to be composed of an exclusive air-cooling air conditioner including a compressor 52, an indoor heat exchanger 56, an expansion apparatus 58 and 59, and the outdoor heat exchanger 60, but not including the 4-way valve. Reference will now be made in detail to the air conditioner composed of the heat pump type air conditioner as follows.

As the heat pump type air conditioner is composed of outdoor machinery O and indoor machinery I, it is possible that the indoor machinery I is connected with the outdoor machinery O. It is also possible that a plurality of indoor machineries I are connected in a row with an outdoor machinery O. It is also possible that a plurality of outdoor machineries O are connected in a row with each other. It is also possible that a plurality of indoor machineries I are connected in a row with each other.

The compressor 52, the 4-way valve 54, the indoor heat exchanger 56, the expansion apparatus 58, and the outdoor heat exchanger 60 are connected by a refrigerant flowing path. An accumulator 53, in which a liquid refrigerant part of a refrigerant, is accumulated is installed at a suction pipe, through which the refrigerant is sucked into the compressor 52.

The 4-way valve 54 controls an inner flow path of the refrigerant compressed at the compressor 52 to the indoor heat exchanger 56, as illustrated in FIGS. 4 to 6, in an air heating operation of the heat pump type air conditioner 50, and controls the inner flow path of the refrigerant compressed at the compressor 52 to the outdoor heat exchanger 60, as illustrated in FIGS. 2 and 3, in an air-cooling operation of the heat pump type air conditioner 50. An indoor fan 57 that sends indoor air to the indoor heat exchanger 56 is installed beside the indoor heat exchanger 56.

The expansion apparatus 58 and 59 are composed of a vessel or a linear expansion valve. The expansion apparatus 58 and 59 include an indoor expansion valve 58 that controls an amount of refrigerant supplied to each indoor machinery I installed at each indoor machinery I, and an outdoor expansion valve 59 that expands the refrigerant in the air heating operation, installed at the outdoor machinery O. An outdoor fan 61 that sends outdoor air to the outdoor heat exchanger 60 is installed beside the outdoor heat exchanger 60.

The compressor 52, the 4-way valve 54, the outdoor expansion valve 59, and the outdoor heat exchanger 60 are installed at the outdoor machinery O. The indoor heat exchanger 56 and the indoor expansion valve 58 are installed at the indoor machinery I. The compressor 52, the indoor fan 57, and the outdoor fan 61 of the heat pump type air conditioner 50 are operated by electricity generated by the electric generator 110.

The heat pump type air conditioner 50 further includes an outdoor heat exchanger bypassing apparatus 62 that bypasses the refrigerant through the outdoor heat exchanger 60. The outdoor heat exchanger bypassing apparatus 62 includes an outdoor heat exchanger bypassing path 63, an end of which is connected with a refrigerant path connected with an inlet of the outdoor heat exchanger 60 and the other end of which is connected with a refrigerant path connected with an outlet of the outdoor heat exchanger 60 to bypass the refrigerant passed through a supply heat exchanger 68 described hereinbelow when in the air-cooling operation, as illustrated in FIGS. 2 and 3, through the outdoor heat exchanger 60, and to bypass of the refrigerant expanded at the indoor expansion valve 58 in the air heating operation through the outdoor heat exchanger 60, as illustrated in FIGS. 5 and 6.

The outdoor expansion valve 59 is installed at the outdoor heat exchanger bypassing path 63. An outdoor expansion valve bypassing path 64A is formed at the outdoor heat exchanger bypassing path 63 to bypass the refrigerant flowing into the outdoor heat exchanger bypassing path 63 through the outdoor expansion valve 59 during the air-cooling operation of the heat pump type air conditioner 50, as illustrated FIGS. 2 and 3.

A check valve 64B that passes therethrough the refrigerant during the air-cooling operation and that passes the refrigerant through the outdoor expansion valve 59 by being blocked during the air heating operation of the heat pump type air conditioner 50 is installed at the outdoor expansion valve bypassing path 64A. An outdoor heat exchanger bypassing path opening and shutting valve 64C that opens and shuts the outdoor heat exchanger bypassing path 63 is installed at the outdoor heat exchanger bypassing path 63.

The outdoor heat exchanger bypassing apparatus 62 further includes an outdoor heat exchanger opening and shutting valve 65A installed at the refrigerant path connected with an outlet of the outdoor heat exchanger 60 during the air heating operation. The outdoor heat exchanger bypassing apparatus 62 additionally includes a connection path 66A that connects the refrigerant path connected with an inlet of the outdoor heat exchanger 60 and the outdoor heat exchanger bypassing path 63 during the air heating operation, and a connection path opening and shutting valve 66B that opens and shuts the connection path 66A. A check valve 65B that prevents the streaming of the refrigerant into the outdoor heat exchanger 60 without passing through the outdoor expansion valve 59 during the air heating operation of the heat pump type air conditioner is installed at the refrigerant path connected with the inlet of the outdoor heat exchanger 60 of the outdoor heat exchanger bypassing apparatus 62.

The outdoor heat exchanger bypassing apparatus 62, as illustrated in FIGS. 2 and 3, opens the outdoor heat exchanger bypassing path opening and shutting valve 64C, as well as shuts the outdoor heat exchanger opening and shutting valve 65A during the air-cooling operation, and shuts the connection path opening and shutting valve 66B, so that the refrigerant bypasses the outdoor expansion valve 59, as well as the outdoor heat exchanger 60.

The outdoor heat exchanger bypassing apparatus 62, as illustrated in FIG. 4, shuts the outdoor heat exchanger bypassing path opening and shutting valve 64C, as well as opens the outdoor heat exchanger opening and shutting valve 65A during an outdoor fan control air heating operation, and opens the connection path opening and shutting valve 66B, so that the refrigerant passes through the outdoor heat exchanger 60 after passing through the outdoor expansion valve 59.

The outdoor heat exchanger bypassing apparatus 62, as illustrated FIGS. 5 and 6, opens the outdoor heat exchanger bypassing path opening and shutting valve 64C, as well as shuts the outdoor heat exchanger opening and shutting valve 65A during a low-pressure control air heating operation and a maximum supply air heating operation, and shuts the connection path opening and shutting valve 66B, so that the refrigerant bypasses the outdoor heat exchanger 60 after passing through the outdoor expansion valve 59.

Meanwhile, the co-generation system further includes the supply heat exchanger 68, which is installed on the refrigerant path of the heat pump type air conditioner 50, that transfers the waste heat recovered from the waste heat recovery heat exchanger 130 to a refrigerant of the heat pump type air conditioner 50, and transfers the heat transferred from the refrigerant of the heat pump type air conditioner 50 to the hot water supply heat exchanger 70, if necessary.

The supply heat exchanger 68 is installed on the refrigerant path between the 4-way valve 54 and the outdoor heat exchanger 60. The supply heat exchanger 68 may be operated as a condenser that condenses the refrigerant during the air-cooling operation of the heat pump type air conditioner 50, and also may be operated as an evaporator that evaporates the refrigerant during the air heating operation of the heat pump type air conditioner 50.

A water boil unit 78, which boils cold or hot water and supplies it to the hot water supply heat exchanger 70, is connected with the hot water supply heat exchanger 70. The water boil unit 78 includes a hot water storage tank 80 that accommodates water therein, and a water circulation path 81 that connects the hot water storage tank 80 and the hot water supply heat exchanger 70.

The hot water storage tank 80 is a kind of heat storage tank that stores the heat recovered from the hot water supply heat exchanger 70. The water circulation path 81 circulates the water of the hot water storage tank 80 through an inside of the hot water storage tank 80 after being supplied to the hot water supply heat exchanger and passed through the hot water supply heat exchanger 70. A hot water storage tank water supply apparatus 82 that supplies the water in the inside of the hot water storage tank 80 to the water circulation path 81 is installed at the water circulation path 81. The hot water storage tank water supply apparatus 82 includes a hot water storage tank pump installed at the water circulation path 81 that pumps the water in the hot water storage tank 80 to be circulated to the hot water storage tank 80 after passing through the hot water supply heat exchanger 70. Further, a water supply path 83 that supplies outside water to the water circulation path 81 is connected thereto. The water supply path 83 is capable of supplying water from a water supply service to the water circulation path 81 as it is directly connected with the water supply service, and is also capable of supplying water from the water supply tank 84 to the water circulation path 81, as it is connected with the separate water supply tank 84. The water supply path 83 will now be described as connected with the water supply tank 84.

A check valve 85 that prevents backward flow of water in the water circulation path 81 through the water supply path 83 and a water supply apparatus 86 that pumps water in the water supply tank 84 to the water supply path 83 are installed at the water supply path 83. The water supply apparatus 86 includes a water supply pump installed at the water supply path 83, between the water supply tank 84 and the check valve 85.

A hot water supply heat exchanger bypassing apparatus that bypasses the water supplied to the water circulation path 81 from the hot water storage tank 80 through the hot water supply heat exchanger 130 is installed at the water circulation path 81. The hot water supply heat exchanger bypassing apparatus includes a hot water supply heat exchanger bypassing path 87 formed at the water circulation path 81, and a hot water supply heat exchanger bypassing valve 88 that controls the water circulation path 81 and the hot water supply heat exchanger bypassing path 87.

The hot water supply heat exchanger bypassing valve 88 controls bypassing of the hot water supply heat exchanger 70 by the water supplied from the hot water storage tank 80 and is installed at a diverging part of the water circulation path 81 and the hot water supply heat exchanger bypassing path 87. The hot water supply heat exchanger bypassing valve 88 has a hot water supply heat exchanger bypassing mode in which the water supplied from the hot water storage tank 80 is bypassed through the hot water supply heat exchanger 70 during a water supplying and boil mode and a circulation mode described hereinbelow, and has a hot water supply heat exchanger supply mode in which the water supplied from the hot water storage tank 80 is bypassed through the hot water supply heat exchanger 70 during a water supplying and heat storing water boil mode and a heat storing mode described hereinbelow. On the other hand, a check valve 89 is installed between the hot water storage tank pump 82 and the hot water supply heat exchanger bypassing valve 88 at the water circulation path 81.

The electric generator 110, which supplies electricity to electronic machinery, such as the heat pump type air conditioner 50 or various illuminations, generates electricity when an output shaft is rotated as a rotor, as an alternator or a direct current generator, is connected with an output shaft of the drive source 120. The electric generator 110 supplies generated electricity through a power line 111 as it is connected with the heat pump type air conditioner 50 by the power line 111.

The drive source 120 includes a fuel cell or an engine operated using gas, petroleum, or fossil fuel. A fuel inlet 121, into which the fuel, such as gas, petroleum, or fossil fuel, is poured, an inlet 122, through which air is inhaled from outside to the engine 120, and an exhaust pipe 123, through which waste gas exhausted from the engine 120 passes, are installed at the engine 120.

The waste heat recovery heat exchanger 130 which includes a coolant heat exchanger 132 that recovers coolant heat of the engine is connected with the engine through a coolant line 124, and an exhaust gas heat exchanger 134 is installed on the exhaust pipe 123 to recover the waste gas heat exhausted from the engine 120. Further, a coolant circulation pump 125 that circulates the coolant through the engine 120 and the coolant heat exchanger 132 is installed at the engine 120 or the coolant line 124.

The electric generator 110, the engine 120, and the waste heat recovery heat exchanger 130 are installed at engine unit EN.

The co-generation system includes a heat transferring apparatus 150 that transfers the heat of the exhaust gas heat exchanger 134 to heat demand places, such as the hot water supply heat exchanger 70 and the air conditioner 50.

The heat transferring apparatus 150 may transfer the heat of the waste heat recovery heat exchanger 130 only to the hot water supply heat exchanger 70 and the heat pump type air conditioner 50, may transfer the heat of the waste heat recovery heat exchanger 130 to the hot water supply heat exchanger 70 and the heat pump type air conditioner 50, and may transfer the heat of the heat pump type air conditioner 50 to the hot water supply heat exchanger 70, if necessary.

As the hot water supply efficiency of the heat transferring apparatus 150 is maximized when the heat of the refrigerant is transferred to the hot water supply heat exchanger 70 during the air-cooling operation of the heat pump type air conditioner 50, the heat transferring apparatus 150 is described as transferring the heat of the waste heat recovery heat exchanger 130 to the hot water supply heat exchanger 70 and the heat pump type air conditioner 50, and the heat of the heat pump type air conditioner 50 to the hot water supply heat exchanger 70, if necessary.

The heat transferring apparatus 150 includes a heat transfer path 170 that connects the heat of the waste heat recovery heat exchanger 130, the hot water supply heat exchanger 70, a radiant heat exchanger 160, and the supply heat exchanger 68. As the radiant heat exchanger 160 exhausts an entire portion of the heat recovered from the waste heat recovery heat exchanger 130 to the outside, if necessary, a radiant heat fan 162 that sends the outside air to the radiant heat exchanger 160 is installed beside the radiant heat exchanger 160.

A heat medium circulation pump 172 that circulates the heat medium, such as an anti-freeze solution (hereinafter referred to as "heat medium") through the waste heat recovery heat exchanger 130, the hot water supply heat exchanger 70, the radiant heat exchanger 160, and the supply heat exchanger 68 is installed at the heat transfer path 170. As the heat transferring apparatus 150 transfers the heat recovered from the engine 120 in accordance with the water boil, air-cooling/air-warming, and a condition of the outdoor temperature when the heat is recovered from the engine, the heat medium having passed through the waste heat recovery heat exchanger 130, and bypassed at least one of the hot water supply heat exchanger 70, the radiant heat exchanger 160, and the supply heat exchanger 68, it is described below that the heat medium having passed through the waste heat recovery heat exchanger 130 bypasses each of the heat exchangers 70, 160, and 68 as discussed herein below.

The heat transferring apparatus 150 further includes a hot water boil/radiant heat exchanger bypassing apparatus 180 that bypasses the heat of the waste heat recovery heat exchanger 130 through the hot water supply heat exchanger 70 and the radiant heat exchanger 160. The water boil/radiant heat exchanger bypassing apparatus 180 includes a water boil/radiant heat exchanger bypassing path 182 formed at the heat transfer path 170, and a water boil/radiant heat exchanger bypassing valve 184 installed at a diverging point of the water boil/radiant heat exchanger bypassing path 182 and the heat transfer path 170.

The heat transfer apparatus 150 further includes a radiant heat exchanger bypassing apparatus 190 that bypasses the heat of the waste heat recovery heat exchanger 130 through the radiant heat exchanger 160. The radiant heat exchanger bypassing apparatus 190 includes a radiant heat exchanger bypassing path 192 formed at the heat transfer path 170, and a radiant heat exchanger bypassing valve 194 installed at a diverging point of the radiant heat exchanger bypassing path 192 and the heat transfer path 170.

The heat transfer apparatus 150 further includes a supply heat exchanger bypassing apparatus 200 that bypasses the heat of the waste heat recovery heat exchanger 130 through the supply heat exchanger 68. The supply heat exchanger bypassing apparatus 200 includes a supply heat exchanger bypassing path 202 formed at the heat transfer path 170, and a supply heat exchanger bypassing valve 204 installed at a diverging point of the supply heat exchanger bypassing path 202 and the heat transfer path 170. Both the hot water supply heat exchanger 70 and the radiant heat exchanger 160 are installed at a radiant unit EX of the co-generation system. All of the water boil/radiant heat exchanger bypassing path 182, the water boil/radiant heat exchanger bypassing valve 184, the radiant heat exchanger bypassing path 192, the radiant heat exchanger bypassing valve 194, the supply heat exchanger bypassing path 202, and the supply heat exchanger bypassing valve 204 are installed at the radiant heat unit EX of the co-generation system.

The co-generation system further includes a control unit 210 that controls the water boil/radiant heat exchanger bypassing valve 184, the radiant heat exchanger bypassing valve 194, the supply heat exchanger bypassing valve 204, the outdoor heat exchanger opening and shutting valve 65A, the outdoor heat exchanger bypassing path opening and shutting valve 64C, and the connection path opening and shutting valve 66B in accordance with the air-cooling/air-warming and water boiling of the heat pump type air conditioner 50. The control unit 210 includes a master PCB 212 installed at the engine unit EN, and a slave PCB 214 installed at the radiant heat unit EX and connected with the master PCB 212 by a control line.

Various kinds of sensors that sense temperature or flux are installed at the co-generation system. That is, the co-generation system includes an intake port temperature sensor 220 composed of a thermistor that senses a temperature of outside air inhaled into an intake port 12, a coolant heat exchanger outlet temperature sensor 222 composed of a thermistor that senses a temperature of an outlet of the coolant heat exchanger 132 of the heat transfer path 170, a exhaust gas heat exchanger outlet temperature sensor 224 composed of a thermistor 224A and a RTD sensor 224B that senses a temperature of an outlet of the exhaust gas heat exchanger 134 of the heat transfer path 170, and an exhaust pipe temperature sensor 226 composed of RTD sensors 226A, 226B that sense each temperature of front and rear of the exhaust gas heat exchanger 134 of the exhaust pipe 123. The intake port temperature sensor 220, the coolant heat exchanger outlet temperature sensor 222, the waste gas heat exchanger outlet temperature sensor 224, and the exhaust pipe temperature sensor 226 are installed at an inside of the engine unit EN.

The co-generation system further includes a No. 1 transfer path temperature sensor 230 that senses a before temperature of the heat medium circulation pump 172 of the heat transfer path 170 and a No. 2 heat transfer path temperature sensor 232 that senses a temperature between the radiant heat exchanger bypassing path 192 and the radiant heat exchanger bypassing valve 204 of the heat transfer path 170. The No. 1 heat transfer path temperature sensor 230 and the No. 2 heat transfer path temperature sensor 232 are installed at the radiant heat unit EX. The radiant heat unit EX is connected with a tank connection path 252, and an expansion tank 250 is connected between the heat medium circulation pump 172 and the supply heat exchanger bypassing path 202 of the heat transfer path 170.

Reference will now be made in detail to an operation of the present invention configured as discussed above.

First, when the engine 120 is operated, the electric generator 110 generates electricity as the rotor is rotated, and the generated electricity is supplied to the heat pump type air conditioner 50 through the power line 111, as illustrated in FIGS. 2 to 5. The exhaust gas heat and the coolant heat of the engine are recovered at the waste heat recovery heat exchanger 130, including the coolant heat exchanger 132, and the exhaust gas heat exchanger 134 during the operation of the engine 120.

The co-generation system controls the bypassing of the refrigerant through the outdoor heat exchanger 60, operates the heat pump type air conditioner 50 to be in an air-cooling mode when the heat pump type air-conditioner 50 is required to perform air-cooling and water boiling, and controls the heat medium of the heat transfer path 170 to be circulated through the waste heat recovery heat exchanger 130, the hot water supply heat exchanger 70, and the supply heat exchanger 68. The heat pump type air conditioner 50 controls the 4-way valve 54 to be in the air-cooling mode, operates the compressor 52, opens the outdoor heat exchanger bypassing path opening and shutting valve 64C, shuts the outdoor heat exchanger opening and shutting valve 65A, and shuts the connection path opening and shutting valve 66B.

In describing the flow of refrigerant in the heat pump type air conditioner 50, high temperature and high pressure refrigerant compressed at the compressor 52 is supplied to the supply heat exchanger 68, passing through the 4-way valve 54, is condensed as the heat is taken away by the supply heat exchanger 68 when it passes through the supply heat exchanger 68, and bypasses the outdoor heat exchanger 60 thereafter.

The refrigerant having bypassed the outdoor heat exchanger 60 is evaporated at the indoor heat exchanger 56 after having been transferred to the indoor machinery I and expanded at the indoor expansion valve 58, and thereafter, circulated to the compressor 52 through the 4-way valve 54 to be transferred to the outdoor machinery O. That is, the refrigerant of the heat pump type air conditioner is condensed at the supply heat exchanger 68, and cools the indoor air as it is evaporated at the indoor heat exchanger 56.

On the other hand, the control unit 210 controls the water boil/radiant heat exchanger bypassing valve 184 to be in the water boil/radiant heat supply mode, operates the heat medium circulation pump 172 for circulation of the heat medium of the heat transfer path 170 through the waste heat recovery heat exchanger 130, the hot water supply heat exchanger 70, and the supply heat exchanger 68, and controls the supply heat exchanger bypassing valve 204 to be in the supply heat exchanger mode.

At this time, as the control unit 210 controls the radiant heat exchanger bypassing valve 194 in accordance with the temperature of the heat medium, it controls the radiant heat exchanger bypassing valve 194 to be in the radiant heat exchanger supply mode, when the temperature of the heat medium is over a set point, and it controls the radiant heat exchanger bypassing valve 194 to be in the bypassing mode, when the temperature of the heat medium is not more than the set point.

In describing the flow of the heat medium in the heat transfer path 170, the heat medium in the heat transfer path 170 is heated as it passes through the waste heat recovery heat exchanger 130 during the operation of the heat medium circulation pump 172, as illustrated in FIG. 2, and streams into the hot water supply heat exchanger 70 as it passes through the waste heat recovery heat exchanger 130.

The heat medium having flowed into the hot water supply heat exchanger 70 heats the hot water supply heat exchanger 70, and thereafter, passes through or bypasses the radiant heat exchanger 160 in accordance with a temperature condition of the system.

The heat medium having passed through or bypassed the radiant heat exchanger 160 is supplied to the supply heat exchanger 68 after passing through the supply heat exchanger bypassing valve 204. A temperature of the heat medium is raised by receiving heat from high temperature and high pressure refrigerant gas passing through the supply heat exchanger 68, and it is circulated to the waste heat recovery heat exchanger 130.

That is, a water boiling capacity of the hot water supply heat exchanger 70 of the co-generation system is improved, as the refrigerant of the heat pump type air conditioner 50 is condensed, the heat is taken away from the heat medium while passing through the supply heat exchanger, and the heat of the waste heat recovery heat exchanger 130 and the heat of the supply heat exchanger 68 are transferred to the hot water supply heat exchanger through the heat transfer path 170.

In the co-generation system, the lower the temperature of the water supplied to the hot water supply heat exchanger 70 from the water boiling unit 78, the larger the amount of heat transference of the hot water supply heat exchanger 70. The heat medium having passed through the hot water supply heat exchanger 70 recovers a lot of heat from the refrigerant while passing through the supply heat exchanger 68, and the consumption of electricity of the compressor is reduced compared with the same air-cooling capacity of the heat pump type air conditioner 50.

The co-generation system controls the refrigerant so as not to pass through the outdoor heat exchanger 60, operates the heat pump type air conditioner 50 to be in the air-cooling mode without request of water boiling, as illustrated in FIG. 3, and controls the heat medium in the heat transfer path 170 to circulate through the exhaust gas heat exchanger 134 and the supply heat exchanger 68. The heat pump type air conditioner 50 controls the 4-way valve 54 to be the in air-cooling mode, operates the compressor 52, opens the outdoor heat exchanger bypassing path opening and shutting valve 64C, shuts the outdoor heat exchanger opening and shutting valve 65A, and shuts the connection path opening and shutting valve. Further, the co-generation system operates the heat medium circulation pump 172 to control the heat medium in the heat transfer path 170 to be circulated through the waste heat recovery heat exchanger 130 and the supply heat exchanger 68, controls the water boil/radiant heat exchanger bypassing valve 184 to be in the water boil/radiant heat exchanger supply mode, controls the radiant heat exchanger bypassing valve 194 to be in the radiant heat exchanger supply mode, and controls the supply heat exchanger bypassing valve 204 to be in the supply heat exchanger supply mode.

In describing the flow of the refrigerant of the heat pump type air conditioner 50, the high-temperature and high-pressure refrigerant compressed at the compressor 52 is supplied to the supply heat exchanger, passes through the 4-way valve 54, is condensed as heat is taken away while passing through the supply heat exchanger 68, and bypasses the outdoor heat exchanger 60. The refrigerant having bypassed the outdoor heat exchanger 60 is evaporated in the indoor heat exchanger 56 after being expanded in the indoor expansion valve 58 after being transferred to the indoor machine I, and thereafter, is transferred to the outdoor machine O and circulated to the compressor 52 through the 4-way valve 54. That is, the refrigerant of the heat pump type air conditioner 50 is condensed at the supply heat exchanger 68 and cools the indoor air as it is evaporated in the indoor heat exchanger 56.

In describing the flow of the heat medium of the heat transfer path 170, illustrated in FIG. 3, the heat medium in the heat transfer path 170 is boiled as it receives heat while passing through the waste heat recovery heat exchanger 130 during operation of the heat medium circulation pump 172, flows into the hot water supply heat exchanger 70 after passing through the water boil/radiant heat exchanger bypassing valve 184, flows into the radiant heat exchanger 192 after passing through the hot water supply heat exchanger 70, and radiates heat to the outside as it passes through the radiant heat exchanger 192. The heat medium is supplied to the supply heat exchanger 68 after passing through the supply heat exchanger bypassing valve 204, and the temperature of it increases as it receives heat from the high-temperature and high-pressure refrigerant gas passing through the supply heat exchanger 68. Thereafter, it is circulated to the exhaust gas heat exchanger 130.

That is, the water boiling capacity of the hot water supply heat exchanger 70 of the co-generation system is improved as the refrigerant of the heat pump type air conditioner 50 is condensed, as the heat of it is taken away from the heat medium while passing through the supply heat exchanger 68, and as the heat of the waste heat recovery heat exchanger 130 and the heat of the supply heat exchanger 68 are transferred to the hot water supply heat exchanger 70 through the heat transfer path 170.

When the heat pump type air conditioner 50 is under the air warming mode without water boiling request, as illustrated in FIG. 4, the co-generation system passes the refrigerant through the outdoor heat exchanger 60, operates the heat pump type air-conditioner 50 to be in the air warming mode, and controls the heat medium in the heat transfer path 170 to be circulated through the waste heat recovery heat exchanger 130 and the hot water supply heat exchanger 70. Or, as illustrated in FIG. 5, controls the refrigerant not to be circulated through the outdoor heat exchanger 60, operates the heat pump type air conditioner 50 to be in the air warming mode, and controls the heat medium in the heat transfer path 170 to be circulated through the waste heat recovery heat exchanger 130, the hot water supply heat exchanger 70, and the supply heat exchanger 68.

It is desirable for the co-generation system, as illustrated in FIG. 4, to maximize the capacity of heat recovery to the hot water supply heat exchanger 70 and the capacity of water boiling by controlling the refrigerant to pass through the outdoor heat exchanger 60, and the heat medium in the heat transfer path 170 to be circulated through the waste heat recovery heat exchanger 130 and the water heat exchanger 70 when the outdoor temperature is not cold enough for the outdoor heat exchanger to not be frosted over. Further, it is desirable for the co-generation system, as illustrated in FIG. 5, to prevent deterioration of the water boiling capacity generated when the outdoor heat exchanger 60 is frosted over by stopping the passing of refrigerant through the outdoor heat exchanger 60 and controlling the heat medium in the heat transfer path 170 to be circulated through the waste heat recovery heat exchanger 130, the hot water supply heat exchanger 70, and the supply heat exchanger 68.

Reference will now be made in detail to a case in which the refrigerant is passed to the outdoor heat exchanger 60, the heat pump type air conditioner 50 is operated to be in the air warming mode, and the heat medium in the heat transfer path 170 is controlled to be circulated through the waste heat recovery heat exchanger 130 and the hot water supply heat exchanger 70, as illustrated in FIG. 4. The heat pump type air conditioner 50 controls the 4-way valve to be in the air-warming mode, operates the compressor 52, shuts the outdoor heat exchanger bypassing path opening and shutting valve 65C, opens opening the outdoor heat exchanger opening and shutting valve 65A, and opens the connection path opening and shutting valve 66B.

In describing the flow of refrigerant in the heat pump type air conditioner 50, the high-temperature and high-pressure refrigerant compressed at the compressor 52 passes through the 4-way valve 54 and is transferred to the indoor machine I, is condensed while passing through the indoor heat exchanger 60 of the indoor machine I, and is expanded while passing through the indoor expansion valve 58. The refrigerant expanded at the indoor expansion valve 58 is transferred to the outdoor machine O and is expanded again while passing through the outdoor expansion valve 59, and flows into the outdoor heat exchanger 60.

The refrigerant having flowed into the outdoor heat exchanger 60 is evaporated while passing through the outdoor heat exchanger 60, passes through the supply heat exchanger 68 without heat exchange, and is circulated to the compressor 52 after passing through the 4-way valve 54. That is, the refrigerant in the heat pump type air conditioner warms indoor air as it is condensed at the indoor heat exchanger 56 and evaporated at the outdoor heat exchanger 60.

The control unit 210 controls the water boil/radiant heat exchanger bypassing valve 184 to be in the water boil/radiant heat exchanger supply mode, operates the heat medium circulation pump 172 to circulate the heat medium in the heat transfer path 170 through the waste heat recovery heat exchanger 130 and the hot water supply heat exchanger 70, and controls the supply heat exchanger bypassing valve 204 to be in the supply heat exchanger bypassing mode. As the control unit 210 controls the radiant heat exchanger bypassing valve 194 in accordance with temperature, it controls the radiant heat exchanger bypassing valve 194 to be in the radiant heat exchanger supply mode when the temperature of the heat medium is over a set point, and controls the radiant heat exchanger bypassing valve 194 to be in the bypassing mode when the temperature is not more than the set point.

In describing the flow of the heat medium in the heat transfer path 170, the heat medium in the heat transfer path 170 is heated as it receives heat while passing through the waste heat recovery heat exchanger 130 during operation of the heat medium circulation pump 172, as illustrated in FIG. 4, and flows into the hot water supply heat exchanger 70, passing through the water boil/radiant heat exchanger bypassing valve 184. The heat medium having flowed into the hot water supply heat exchanger 70 heats the hot water supply heat exchanger 70, transferring heat to the hot water supply heat exchanger 70, and passes through or bypasses the radiant heat exchanger 160 in accordance with the temperature condition of the system.

The heat medium having passed through or bypassed the radiant heat exchanger 160 bypasses the supply heat exchanger 68 after passing through the supply heat exchanger bypassing valve 204, and is circulated through the waste heat recovery heat exchanger 130. That is, the water boiling capacity of the hot water supply heat exchanger 70 of the co-generation system is improved, as the heat of the waste heat recovery heat exchanger 130 is transferred to the water heat exchanger 70 through the heat transfer path 170.

Reference will now be made in detail to a case in which the refrigerant is not passed to the outdoor heat exchanger 60, the heat pump type air conditioner 50 is operated to be in the air warming mode, and the heat medium in the heat transfer path 170 is controlled to be circulated through the waste heat recovery heat exchanger 130, the hot water supply heat exchanger 70, and the supply heat exchanger 68. The heat pump type air conditioner 50 controls the 4-way valve 54 to be in the air warming mode, operates the compressor 52, opens the outdoor heat exchanger bypassing valve 65, and shuts the outdoor heat exchanger bypassing valve 64 and the connection path opening and shutting valve 67. In describing the flow of the refrigerant of the heat pump type air conditioner 50, the high-temperature and high-pressure refrigerant compressed at the compressor 52 is transferred to the indoor machine I, passing through the 4-way valve, is condensed while passing through the indoor heat exchanger 60 of the indoor machine I, and is expanded while passing through the indoor expansion valve 58. The refrigerant expanded at the indoor expansion valve 58 is transferred to the outdoor machine O, is expanded again while passing through the outdoor expansion valve 59, and bypasses the outdoor heat exchanger 60. The refrigerant having bypassed the outdoor heat exchanger 60 is evaporated, as it receives heat from the supply heat exchanger 68 while passing through the supply heat exchanger 68, and is circulated to the compressor after passing through the 4-way valve 54. That is, the refrigerant 50 of the heat pump type air conditioner 50 is condensed at the indoor heat exchanger 56, and warms the indoor air as it is evaporated at the supply heat exchanger 68.

The control unit 210 controls the water boil/radiant heat exchanger bypassing valve 184 to be in the water boil/radiant heat exchanger supply mode, operates the heat medium circulation pump 172 for the heat medium in the heat transfer path 170 to be circulated through the waste heat recovery heat exchanger 130, the hot water supply heat exchanger 70, and the supply heat exchanger 68, and controls the supply heat exchanger bypassing valve 204 to be in the supply heat exchanger supply mode. As the control unit 210 controls the radiant heat exchanger bypassing valve 194 in accordance with a temperature of the heat medium, it controls the radiant heat exchanger bypassing valve 194 to be in the radiant heat exchanger supply mode when the temperature of the heat medium is over a set point, and it controls the radiant heat exchanger bypassing valve 194 to be in the bypassing mode when the temperature of the heat medium is not more than the set point. In describing the flow of the heat medium in the heat transfer path 170, the heat medium in the heat transfer path 170 is heated, as it receives heat while passing through the waste heat recovery heat exchanger 130 during the operation of the heat medium circulation pump 172, as illustrated in FIG. 5, and it flows into the hot water supply heat exchanger 70 after passing through the water boil/radiant heat exchanger bypassing valve 184. The heat medium having flowed into the water supply heat exchanger 70 heats the hot water supply heat exchanger 70, transferring heat thereto, and passing through or bypassing the radiant heat exchanger 160 in accordance with the temperature condition of the system. The heat medium having passed through or bypassed the radiant heat exchanger 160 is supplied to the supply heat exchanger 68 through the supply heat exchanger bypassing valve 204, evaporates the refrigerant, as the refrigerant is heated as it passes through the supply heat exchanger 68, and is circulated to the waste heat recovery heat exchanger 130. That is, the hot water supply efficiency of the water heat exchanger 70 of the co-generation system is improved as the heat of the waste heat recovery heat exchanger 130 is transferred to the hot water supply heat exchanger 70 through the heat transfer path 170, and frosting and a reduction of air warming capacity when the refrigerant passes through the outdoor heat exchanger 60 are prevented as the supply heat exchanger 68 can prevent the refrigerant from passing through the outdoor heat exchanger 60 when it operates as a evaporator.

The co-generation system controls the refrigerant not to pass through the outdoor heat exchanger 60, operates the heat pump type air conditioner 50 to be in the air warming mode, and controls the heat medium in the heat transfer path 170 not to be circulated through the waste heat recovery heat exchanger 130, the supply heat exchanger 68, and the hot water supply heat exchanger 70 when the heat pump type air conditioner 50 is in the air warming mode without the water boiling mode, as illustrated in FIG. 6. The heat pump type air conditioner 50 controls the 4-way valve 54 to be in the air warming mode, operates the compressor 52 and opens the outdoor heat exchanger bypassing valve 65, and shuts the outdoor heat exchanger outlet valve 64 and the connection path opening and shutting valve 67. In describing the flow of the refrigerant in the heat pump type air conditioner 50, the high-temperature and high-pressure refrigerant compressed at the compressor 52 is transferred to the indoor machinery I, passing through the 4-way valve 54, is condensed while passing through the indoor heat exchanger 60 of the indoor machinery I, and is expanded while passing through the indoor expansion valve 58. The refrigerant expanded at the indoor expansion valve 58 is transferred to the outdoor machinery O, is expanded again while passing through the outdoor expansion valve 59, and bypasses the outdoor heat exchanger 60. The refrigerant having bypassed the outdoor heat exchanger 60 is evaporated while passing through the supply heat exchanger 68, and is circulated to the compressor 52, passing through the 4-way valve 54. That is, the refrigerant of the heat pump type air conditioner 50 warms the indoor air as it is condensed at the indoor heat exchanger 56 and evaporated at the supply heat exchanger 68.

The control unit 210 operates the heat medium circulation pump 172 for the heat medium in the heat transfer path 170 to be circulated through the waste heat recovery heat exchanger 130 and the supply heat exchanger 68, and controls the hot water boil/radiant heat exchanger bypassing valve 184 to be in the hot water boil/radiant heat exchanger bypassing mode so that the heat medium does not pass through the hot water supply heat exchanger 70.

In describing the flow of the heat medium of the heat transfer path 170, during the operation of heat medium circulation pump 172, as illustrated in FIG. 6, the heat medium in the heat transfer path 170 is heated as it receives heat while passing through the waste heat recovery heat exchanger 130, then, bypasses the hot water supply heat exchanger 70, the radiant heat exchanger 160, and flows into the supply heat exchanger 68. The heat medium having flowed into the supply heat exchanger 68 evaporates the refrigerant as the refrigerant is heated as it passes through the supply heat exchanger 68, and is circulated to the waste heat recovery heat exchanger 130. That is, the heat of the waste heat recovery heat exchanger 130 of the co-generation system having the water boil function is not transferred to the hot water supply heat exchanger 70, but is centralized to the supply heat exchanger 68, and consumption electricity of the compressor 52 is reduced as the pressure rises with the evaporation of the refrigerant of the heat pump type air-conditioner 50 at the supply heat exchanger 68.

Figure 7:
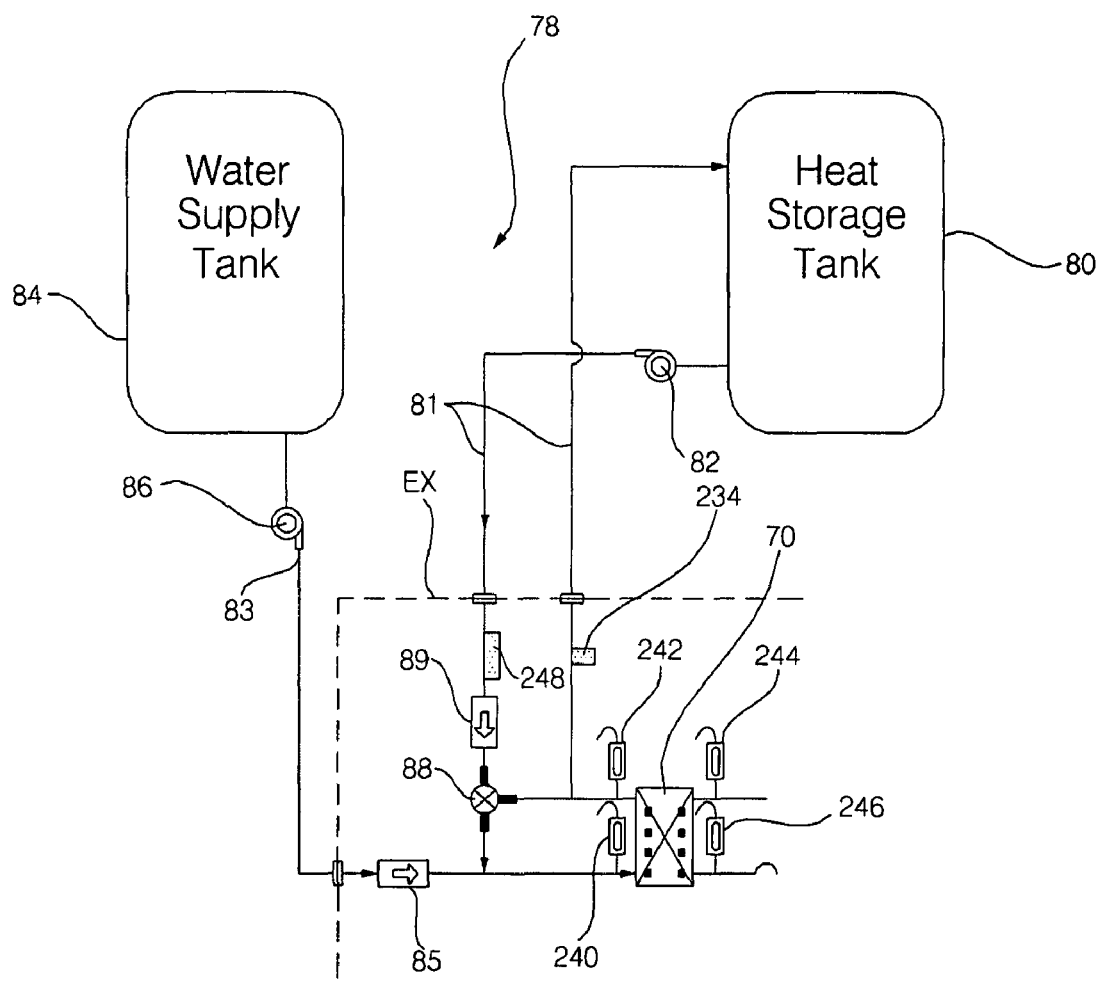
FIG. 7 is a magnified view of a water boil unit of an embodiment of a co-generation system according to the present invention under a water supply and heat accumulation water boil mode.
Figure 8:
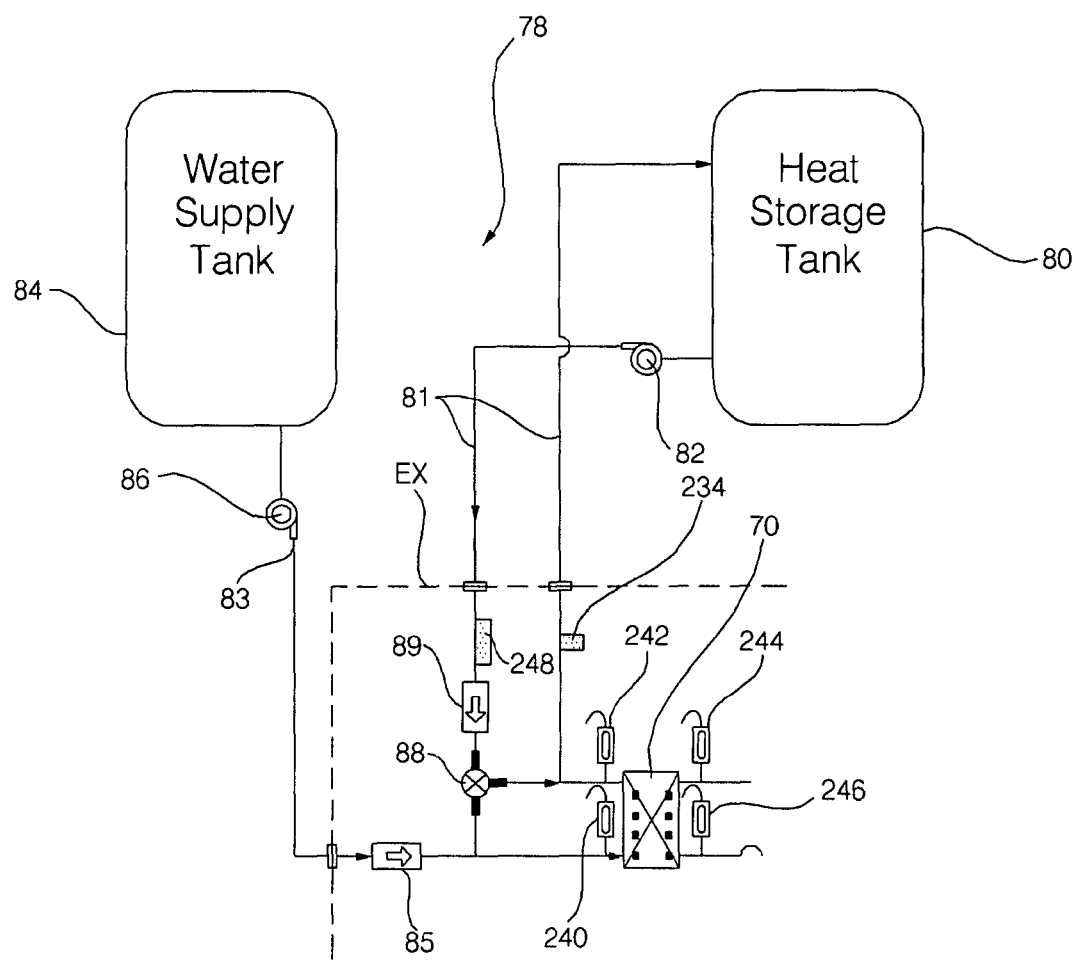
FIG. 8 is a magnified view of a water boil unit of an embodiment of a co-generation system according to the present invention under a water supply and water boil mode.
Figure 9:
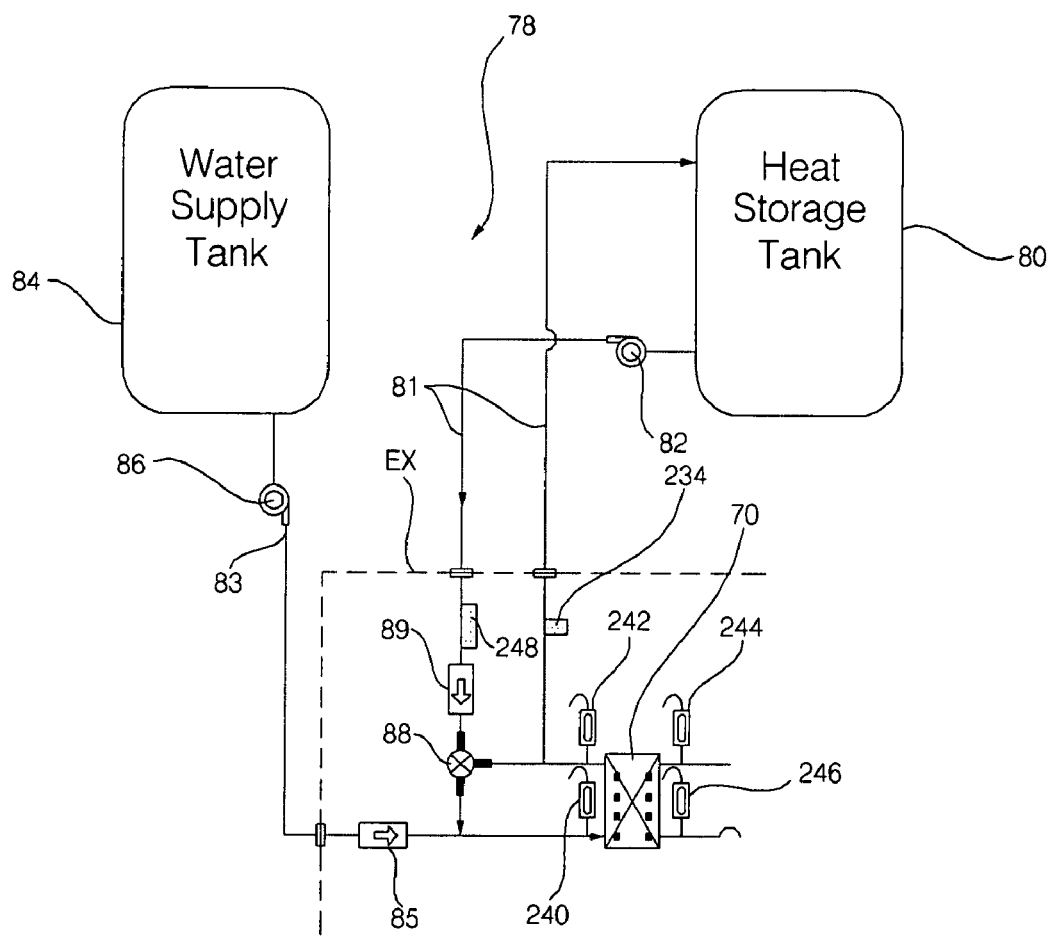
FIG. 9 is a magnified view of a water boil unit of an embodiment of a co-generation system according to the present invention under a heat accumulation mode.
Figure 10:
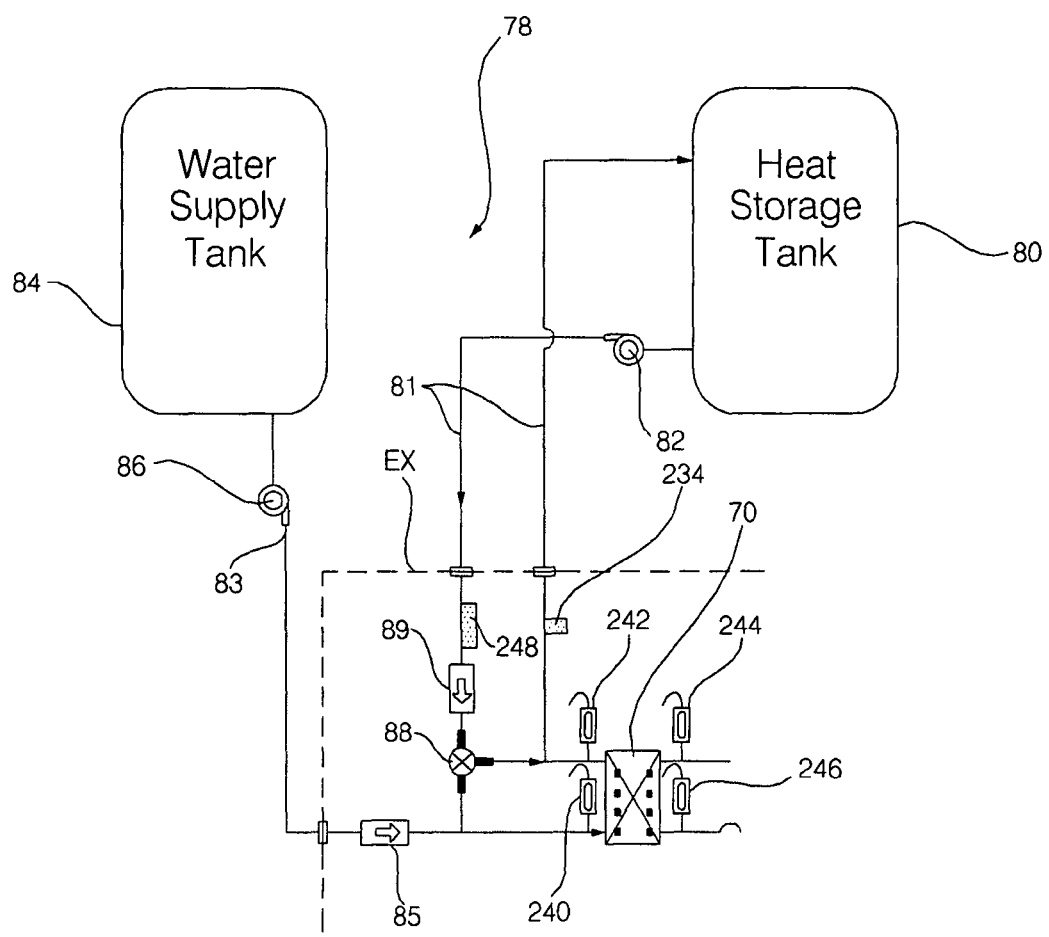
FIG. 10 is a magnified view of a water boil unit of an embodiment of a co-generation system according to the present invention under a circulation mode.

FIG. 7 is a magnified view of a water boil unit of an embodiment of a co-generation system according to the present invention in a water supply and heat accumulation water boil mode. FIG. 8 is a magnified view of a water boil unit of an embodiment of a co-generation system according to the present invention in the water supply and water boil mode. FIG. 9 is a magnified view of a water boil unit of an embodiment of a co-generation system according to the present invention under a heat accumulation mode. FIG. 10 is a magnified view of a water boil unit of an embodiment of a co-generation system according to the present invention under a circulation mode.

The co-generation system, as illustrated in FIGS. 7 to 10, includes a water boil recovery inlet temperature sensor 240 composed of a RTD sensor and a temperature sensor that gauges or senses a temperature of the water flowing into the hot water supply heat exchanger 70; a water boil recovery outlet temperature sensor 242 composed of a RTD sensor and a temperature sensor that gauges or senses a temperature of the water discharged from the hot water supply heat exchanger; a water boil inlet temperature sensor 244 composed of a RTD sensor and a temperature sensor that gauges or senses a temperature of the heat medium flowing into the hot water supply heat exchanger 70; and a water boil outlet temperature sensor 246 composed of a RTD sensor and a temperature sensor that gauges or senses a temperature of the heat medium discharged from the hot water supply heat exchanger. The co-generation system further includes a hot water storage tank temperature sensor 248 composed of a thermistor that gauges or senses a temperature of the water supplied to the water circulation path 81 from the hot water storage tank 80. A water circulation path flow meter 234, the water boil recovery inlet temperature sensor 240, the water boil recovery outlet temperature sensor 242, the water boil inlet temperature sensor 244, the water boil outlet temperature sensor 246, and the hot water storage tank temperature sensor 248 are installed at the radiant unit EX.

The control unit 210 of the co-generation system controls the water supply pump 86 as a water supply apparatus, the hot water storage tank pump 82 as a water supply apparatus of the hot water storage tank, and the hot water supply heat exchanger bypassing valve 88 in accordance with the temperatures sensed by the water boil recovery inlet temperature sensor 240, the water boil inlet temperature sensor 244, and the hot water storage tank temperature sensor 248. The control unit 210 controls the water boil unit 78 to be in the water supply and heat store water boil mode, circulating the water in the hot water storage tank 80 and supplying the water in the water supply tank 84 without connection with the air-cooling/air heating operation, as illustrated in FIG. 7, when the temperature of the hot water storage tank 80 is at a first set point more than the temperature of the water boil recovery inlet at a water boiling request, and the temperature of the water boil inlet is at a second set point more than the temperature of the hot water storage tank.

The first set point is a set temperature that determines cold water supplying by the water supply pump 86. It will be described to be set at 1 degree C. for convenience of description. The second set point is a set temperature that determines heat storing of the hot water storage tank 80. It will be described to be set at 3 degree C. for convenience of description.

The control unit 210 controls the hot water supply heat exchanger bypassing valve 88 to be in the heat exchanger supply mode, and operates the water supply pump and the hot water storage tank pump 82. The water in the hot water storage tank 80 is supplied to the water circulation path 81 by the hot water storage tank pump 82, flows into the hot water supply heat exchanger 70 after passing through the hot water supply heat exchanger bypassing valve 88, is heated as heat is taken from the heat medium while passing through the hot water supply heat exchanger 80, and then, is circulated into the hot water storage tank 80 through the water circulation path 81.

The water in the water supply tank 84 is supplied to the water supply path and the water circulation path 81 by the water supply pump 86, flows into the hot water supply heat exchanger 70, as it is mixed with the hot water supplied to the water circulation path 81 from the hot water storage tank 80, and is supplied to the hot water storage tank 80 through the water circulation path 81 after being heated by taking heat from the hot water supply heat exchanger 70. The hot water supply heat exchanger 70 heats not only the cold water supplied from the water supply tank 84, but supplies the heat medium with the recovered heat of the waste heat recovery heat exchanger 130 and the hot water circulated from the hot water storage tank 80, and the water boil unit 78 boils water in record time.

The temperature decent scale of the heat medium passing through the hot water supply heat exchanger 70 is large, as heat exchanged with the cold water and the hot water of the hot water storage tank 80 has a lower temperature compared with the temperature of the water boil inlet, and the heat medium passing through the hot water supply heat exchanger 70 takes a lot of heat from the refrigerant passing through the supply heat exchanger 68 while passing through the supply heat exchanger 68, and transfers a lot of heat with cold water while passing the hot water supply heat exchanger 70 again.

The control unit 210 controls the water boil unit 78 to be in the water supply and boil mode, circulating the water in the hot water storage tank 80 to bypass the hot water supply heat exchanger 70 and supplying the water in the water supply tank 84, as illustrated in FIG. 8, without any consequence to the air-cooling/air heating operation when the temperature of the hot water storage tank 80 is at the first set point more than the temperature of the water boil recovery inlet temperature and there is a water boiling request, and the temperature of the water boil inlet is not at the second set point more than the temperature of the hot water storage tank. Further, the control unit 210 controls the hot water supply heat exchanger bypassing valve 88 to be in the hot water supply heat exchanger bypassing mode, and operates the water supply pump 86 and the hot water storage tank pump 82.

The water in the hot water storage tank 80 is supplied to the water circulation path 81 by the hot water storage tank pump 82, bypasses the hot water supply heat exchanger 70, passing through the hot water supply heat exchanger bypassing valve 88, and is circulated into the hot water storage tank 80 through the water circulation path 81. The water in the water supply tank 84 is supplied to the water circulation path 81 after being supplied to the water supply path 83 by the water supply pump 86, is heated with heat taken from the hot water supply heat exchanger 80 after flowing into the hot water supply heat exchanger 70, and is supplied to the hot water storage tank 80 and mixed with the hot water circulated through the water circulation path 81. In the hot water supply heat exchanger 70, the heat medium having recovered the heat of the waste heat recovery heat exchanger 130 and having not heat exchanged directly with the hot water has a big temperature variation in comparison to the water boil inlet, and heats only cold water supplied from the water supply tank 84, and the water boil unit 78 boils water in record time. As the heat medium having passed through the hot water supply heat exchanger 70 is heat exchanged with the cold water, the reduction in temperature of the heat medium is high, as it takes a lot of heat from the refrigerant while passing through the supply heat exchanger 68 while passing the supply heat exchanger 68, and transfers much heat with cold water while passing through the hot water supply heat exchanger 70.

When water boiling is required, the control unit 210 controls the water-boiling unit 78 to be in the heat-storing mode so that cold water in the water supply tank 84 is not supplied/heated and only water in the hot water storing tank 80 is circulated through the hot water supply heat exchanger 70, as illustrated in FIG. 9, without consequence to the air-cooling/air-warming operation when the temperature of the hot water storage tank is not at the first set point more than the temperature of the water boil recovery inlet, and the temperature of the water boil inlet is at the second set point more than the temperature of the hot water storage tank. The control unit 210 stops operating the water supply pump 86, and controls the hot water supply heat exchanger bypassing valve 88 to be in the hot water supply heat exchanger supply mode, and operates the hot water storage tank pump 82.

The water in the hot water storage tank 80 is supplied to the water circulation path 81 by the hot water storage tank pump 82, flows into the hot water supply heat exchanger 70 after passing through the hot water supply heat exchanger bypassing valve 88, and is circulated into the hot water storage tank 80 through the water circulation path 81 after taking heat from the heat medium while passing through the hot water supply heat exchanger 70. The water boil unit 78 does not supply the water because the temperature of the water in the hot water storage tank is not at the first set point more than the temperature of the water boil recovery inlet, and only heats the water in the hot water storage tank 70 rapidly as the temperature of the water boil inlet is at the second set point more than the temperature of the hot water storage tank.

In the hot water supply heat exchanger 70, the heat medium recovered heat from the waste heat recovery heat exchanger 130 is heat exchanged with the hot water in the hot water storage tank 80, which has a lower temperature than the heat medium passing through the hot water supply heat exchanger 70, and the water boil unit 78 boils the water as quickly as it can. The heat medium having passed through the hot water supply heat exchanger 70 exchanges heat with the hot water supplied from the hot water storage tank 80, is heated with the heat taken from the refrigerant passing through the supply heat exchanger 68, while passing through the supply heat exchanger 68, and then, transfers heat with the hot water while passing through the hot water supply heat exchanger 70. When water boiling is required, and when the temperature of the hot water storage tank is not at the first set point more than the temperature of the water boil recovery inlet and the temperature of the water boil inlet is not the second set point more than the temperature of the hot water storage tank, the control unit 210 controls the water boil unit 78 to be in the circulation mode, not supplying/heating the water in the water supply tank 84 and bypassing the water in the hot water storage tank 80 through the hot water supply heat exchanger 70 without consequence to the air-cooling/air heating operation, as illustrated in FIG. 10. The control unit 210 stops operating the water supply pump 86 and controls the hot water supply heat exchanger bypassing valve 88 to be in the hot water supply heat exchanger bypassing mode as well as operating the hot water storage tank pump 82. The water in the hot water storage tank 80 is supplied to the water circulation path 81 by the hot water storage tank pump 82 and bypasses the hot water supply heat exchanger 70, passing through the hot water supply heat exchanger bypassing valve 88, and is circulated into the hot water storage tank 80 through the water circulation path 81. That the water boil unit 78 doesn't supply water, as the temperature of the hot water storage tank is not at the first set point more than the temperature of the water boil recovery inlet, and only circulates the water in the hot water storage tank 80 as the temperature of the water boil inlet is not at the second set point more than the temperature of the hot water storage tank. In the hot water supply heat exchanger 70, the heat medium recovered heat of the waste heat recovery heat exchanger 130 is not heat exchanged with the cold water or hot water of the water boil unit 78, but is just supplied to the supply heat exchanger 68.

Figure 11:
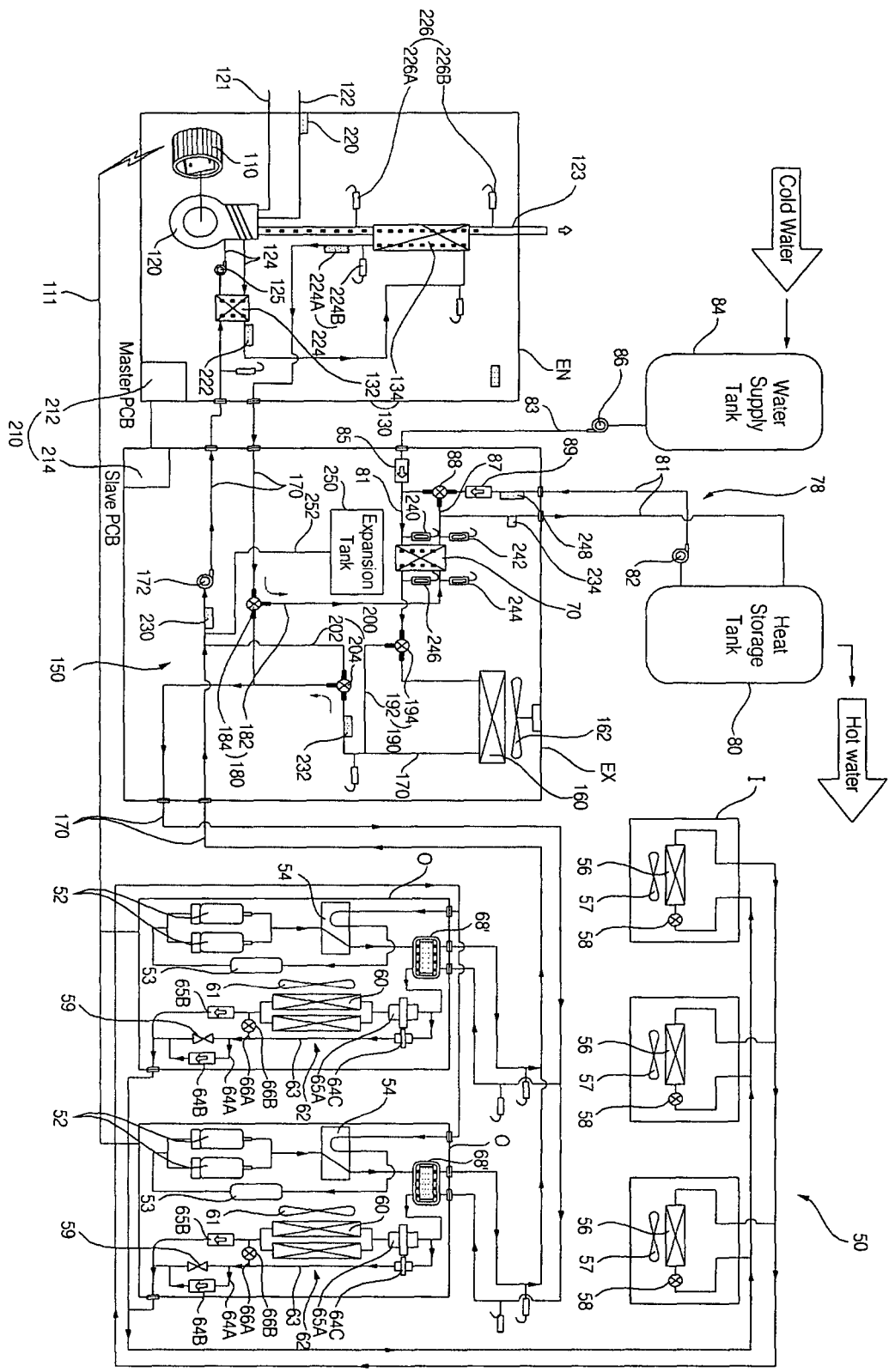
FIG. 11 is a block diagram of another embodiment of a co-generation system according to the present invention.

FIG. 11 is a block diagram of another embodiment of the co-generation system according to the present invention. The supply heat exchanger 68 of the co-generation system according to the present embodiment is installed inside of the outdoor machinery O, and like reference numerals are used to indicate the same or similar elements to the co-generation system according to other embodiments of the present invention, and repetitive description has been omitted.

A part of the heat transfer path 170 connected with the supply heat exchanger 68 is arranged to pass through the outdoor machine O. On the other hand, the present invention isn't limited to the above-mentioned embodiment, and it is possible to include the hot water supply heat exchanger 70, the hot water supply heat exchanger bypassing apparatus, the supply heat exchanger 68, and the supply heat exchanger bypassing apparatus 200 without the exhaust gas heat exchanger 134 and the exhaust gas heat exchanger bypassing apparatus 190, and it is possible for the engine unit EN and the heat radiant unit EX to be a single composition, and various embodiments are possible in the scope the present invention is included.

Reference will now be made in detail as to the effects of the co-generation system and the control method of the same of the present invention configured as above.

The co-generation system and the control method of the same according to the present invention has an advantage in that the effective water boil heat is increased, as the cold water from the water service and the hot water from the hot water storage tank are supplied to the hot water supply heat exchanger properly and heat exchanged with the heat medium, such as an anti freezing solution, while passing through the hot water supply heat exchanger.

Moreover, the co-generation system and the control method of the same according to the present invention has an advantage in that consumption of electricity of the compressor is reduced, as condensing pressure is lowered by increasing the heat exchanging when the heat medium condenses the refrigerant in the supply heat exchanger during the air-cooling operation.

Furthermore, the co-generation system and the control method of the same according to the present invention has an advantage in that the amount of water boiling heat is increased, as the heat medium which takes heat from the refrigerant in the supply heat exchanger is supplied to the hot water supply heat exchanger and used for water boiling again.

What is claimed is:

1. A co-generation system, comprising:
   an electric generator;
   a drive source that operates the electric generator;
   a waste heat recovery heat exchanger that recovers waste heat of the drive source;
   a hot water supply heat exchanger that boils water;
   a hot water storage tank connected with the hot water supply heat exchanger through a water circulation path;
   a water supply path connected with the water circulation path;
   a hot water supply heat exchanger bypassing apparatus that bypasses the water of the water circulation path from the hot water supply heat exchanger;
   a heat pump type air conditioner including a compressor, a 4-way valve, an outdoor heat exchanger, an outdoor heat exchanger bypassing path, an expansion apparatus, and an indoor heat exchanger;
   a supply heat exchanger installed on a refrigerant path of the air conditioner connected between the outdoor heat exchanger, the outdoor heat exchanger bypassing path, and the 4-way valve, such that refrigerant flows therethrough during an operation of the air conditioner;
   a radiant heat exchanger that radiates heat to an outside installed between the hot water supply heat exchanger and the supply heat exchanger;
   a heat transfer path that connects the waste heat recovery heat exchanger, the hot water supply heat exchanger, and the supply heat exchanger;
   a water boil/radiant heat exchanger bypassing apparatus including a water boil/radiant heat exchanger bypassing path and valve that bypasses the heat medium of the waste heat recovery heat exchanger from the hot water supply heat exchanger and the radiant heat exchanger;
   a radiant heat exchanger bypassing apparatus including a radiant heat exchanger bypassing path and valve that bypasses the heat medium of the waste heat recovery heat exchanger from the radiant level exchanger; and
   a supply heat exchanger bypassing apparatus including a supply heat exchanger bypassing path and valve that bypasses the heat medium of the waste heat recovery heat exchanger from the supply heat exchanger, wherein the water boil/radiant heat exchanger bypassing valve and the supply heat exchange bypassing valve are actuated to close the water boil/radiant heat exchanger bypassing path and the supply heat exchange bypassing path such that a heat medium in the heat transfer path is circulated through the waste heat recovery heat exchanger, the hot water supply heat exchanger, and the supply heat exchanger during an air-cooling and water boiling mode, and wherein the water boil/radiant heat exchange bypassing valve is actuated to open the water boil/radiant heat exchange bypassing path such that the heat medium in the heat transfer path is circulated through the waste heat recovery heat exchanger and the supply heat exchanger during an air-heating and non water-boiling mode.

2. The co-generation system according to claim 1, wherein a check valve is installed at or on the water supply path.

3. The co-generation system according to claim 1, wherein the water supply path is connected with a water supply tank.

4. The co-generation system according to claim 1, further comprising:
   a hot water storage tank water supply apparatus that supplies water in the hot water storage tank to the water circulation path; and
   a water supply apparatus that supplies water to the water supply path.

5. The co-generation system according to claim 4, wherein the hot water supply heat exchanger bypassing apparatus comprises:
   a hot water supply heat exchanger bypassing path; and
   a hot water supply heat exchanger bypassing valve that controls the water circulation path and the hot water supply heat exchanger bypassing path.

6. The co-generation system according to claim 5, wherein a check valve is installed between the hot water storage tank and the hot water supply heat exchanger bypassing valve in the water circulation path.

7. The co-generation system according to claim 5, further comprising:
   a hot water storage tank temperature sensor that senses a temperature of the water supplied to the water circulation path from the hot water storage tank;
   a water boil recovery inlet temperature sensor that senses a temperature of the water flowing into the hot water supply heat exchanger;
   a water boil inlet temperature sensor that senses a temperature of the heat medium flowing into the hot water supply heat exchanger; and
   a controller that controls the water supply apparatus, the hot water storage tank water supply apparatus, and the hot water supply heat exchanger bypassing valve in accordance with the temperatures sensed by the hot water storage tank temperature sensor, the water boil recovery inlet temperature sensor, and the water boil inlet temperature sensor.

8. The co-generation system according to claim 7, wherein the hot water storage tank water supply apparatus is a hot water storage tank pump installed at or on the water circulation path, and wherein the water supply apparatus is a water supply pump installed at or on the water supply path.

9. The co-generation system according to claim 8, wherein the cogeneration system operates the water supply pump and the hot water storage tank pump, and controls the hot water supply heat exchanger bypassing valve to be in a hot water supply heat exchanger supply mode when the temperature of the hot water storage tank is a first set point more than the temperature of the water boil recovery inlet and the temperature of the water boil inlet is a second set point more than the temperature of the hot water storage tank.

10. The co-generation system according to claim 8, wherein the co-generation system operates the water supply pump and the hot water storage tank pump, and controls the hot water supply heat exchanger bypassing valve to be in a hot water supply heat exchanger bypassing mode when the temperature of the hot water storage tank is a first set point more than the temperature of the water boil recovery inlet and the temperature of the water boil inlet is not a second set point more than the temperature of the hot water storage tank.

11. The co-generation system according to claim 8, wherein the co-generation system operates the hot water storage tank pump as well as stops the operation of the water supply pump, and controls the hot water supply heat exchanger bypassing valve to be in a hot water supply heat exchanger supply mode when the temperature of the hot water storage tank is not a first set point more than the temperature of the temperature of the water boil recovery inlet and the temperature of the water boil inlet is a second set point more than the temperature of the hot water storage tank.

12. The co-generation system according to claim 8, wherein the co-generation system operates the hot water storage tank pump as well as stops the operation of the water supply pump, and controls the hot water supply heat exchanger bypassing valve to be in a hot water supply heat exchanger bypassing mode when the temperature of the hot water storage tank is not a first set point more than the temperature of the water boil recovery inlet and the temperature of the water boil inlet is not a second set point more than the temperature of the hot water storage tank.

* * * * *